US009902268B2

(12) United States Patent
Nojiri

(10) Patent No.: US 9,902,268 B2
(45) Date of Patent: Feb. 27, 2018

(54) DISPLAY DEVICE FOR VEHICLE

(71) Applicant: DENSO CORPORATION, Kariya, Aichi-pref. (JP)

(72) Inventor: Shota Nojiri, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/318,384

(22) PCT Filed: Jun. 23, 2015

(86) PCT No.: PCT/JP2015/003124
§ 371 (c)(1),
(2) Date: Dec. 13, 2016

(87) PCT Pub. No.: WO2016/021102
PCT Pub. Date: Feb. 11, 2016

(65) Prior Publication Data
US 2017/0174081 A1   Jun. 22, 2017

(30) Foreign Application Priority Data

Aug. 6, 2014  (JP) .................. 2014-160222
Aug. 6, 2014  (JP) .................. 2014-160223
Aug. 6, 2014  (JP) .................. 2014-160224

(51) Int. Cl.
*B60K 35/00*     (2006.01)
*F16H 19/06*     (2006.01)
*B60K 37/02*     (2006.01)

(52) U.S. Cl.
CPC .............. *B60K 35/00* (2013.01); *B60K 37/02* (2013.01); *F16H 19/06* (2013.01); *B60K 2350/1064* (2013.01); *B60K 2350/1072* (2013.01); *B60K 2350/203* (2013.01); *B60K 2350/352* (2013.01); *F16H 2019/0686* (2013.01)

(58) Field of Classification Search
CPC .. B60K 35/00; B60K 37/02; B60K 2350/203; B60K 2350/352; B60K 2350/1064; B60K 2350/1072; F16H 19/06; F16H 2019/0686
See application file for complete search history.

(56) References Cited

U.S. PATENT DOCUMENTS

2007/0088501 A1   4/2007 Kato et al.
2007/0115107 A1   5/2007 Kageyama et al.
(Continued)

FOREIGN PATENT DOCUMENTS

JP  2005331317 A   12/2005
JP  2007131292 A   5/2007
JP  2007137261 A   6/2007
(Continued)

*Primary Examiner* — David V Bruce
(74) *Attorney, Agent, or Firm* — Harness, Dickey & Pierce, P.L.C.

(57) ABSTRACT

A display device for a vehicle includes: a ring portion and a moving mechanism to display various vehicle information associated with a travel of the vehicle for a viewer within a display area. The ring portion forms an outer periphery of an indicator indicating at least one vehicle information of the various vehicle information, and is visually recognized as a virtual image within the display area. The moving mechanism is able to move a position of the ring portion.

6 Claims, 16 Drawing Sheets

(56) References Cited

U.S. PATENT DOCUMENTS

2013/0186324 A1      7/2013  Kato
2015/0379776 A1*    12/2015  Ito ........................... G01D 7/04
                                                          345/419

FOREIGN PATENT DOCUMENTS

| JP | 2009192434 A | 8/2009 |
|----|--------------|--------|
| JP | 4418296 B2   | 2/2010 |
| JP | 2013137283 A | 7/2013 |
| JP | 2013147196 A | 8/2013 |

* cited by examiner

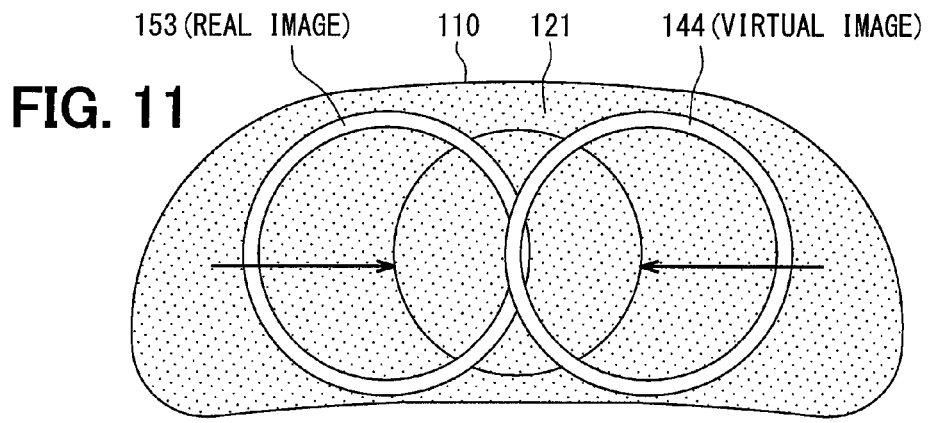
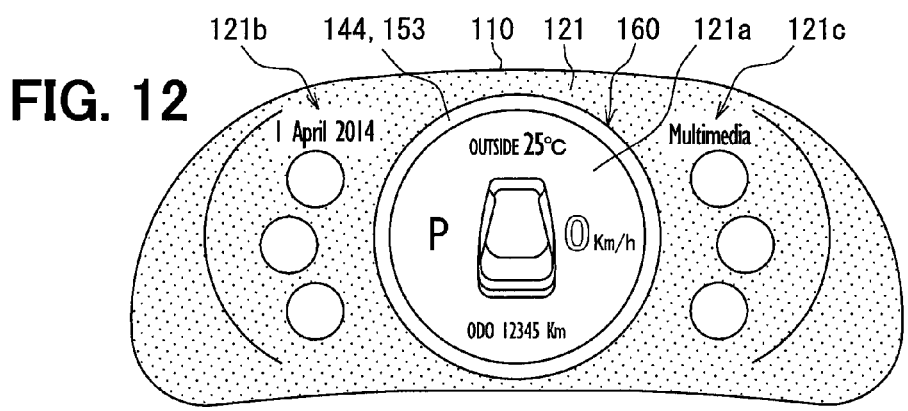
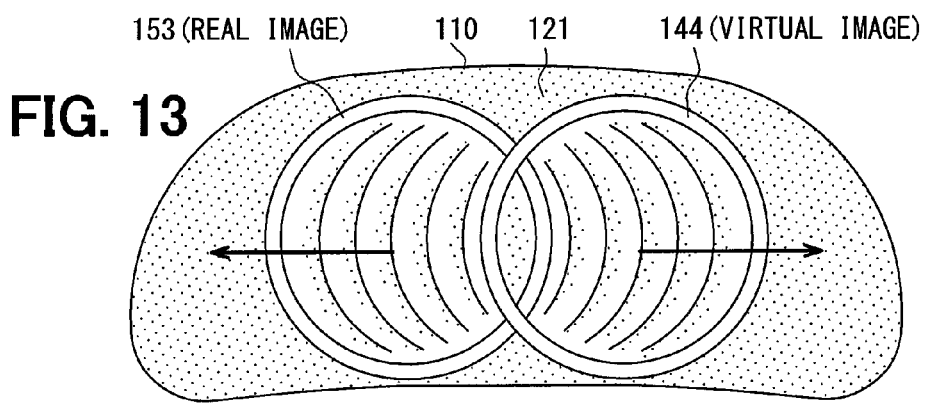

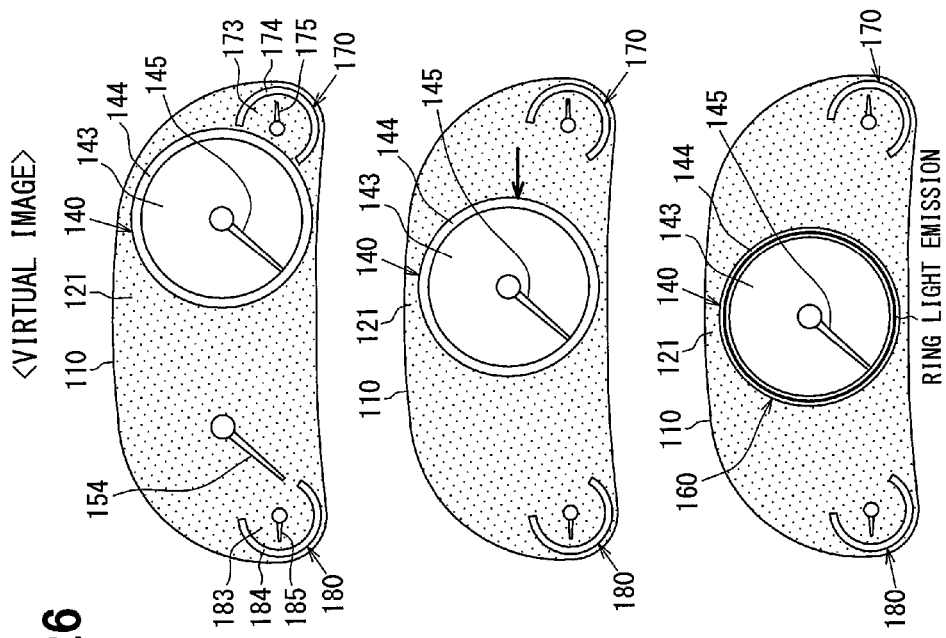
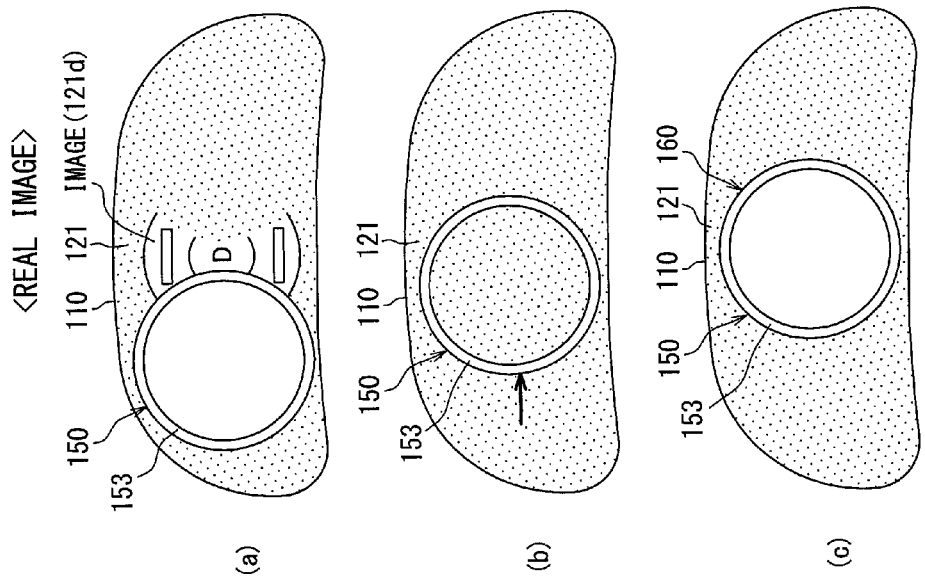
FIG. 26

DISPLAY DEVICE FOR VEHICLE

CROSS REFERENCE TO RELATED APPLICATIONS

This application is a U.S. National Phase Application under 35 U.S.C. 371 of International Application No. PCT/JP2015/003124 filed on Jun. 23, 2015 and published in Japanese as WO 2016/021102 A1 on Feb. 11, 2016. This application is based on and claims the benefit of priority from Japanese Patent Application No. 2014-160222 filed on Aug. 6, 2014, Japanese Patent Application No. 2014-160223 filed on Aug. 6, 2014, and Japanese Patent Application No. 2014-160224 filed on Aug. 6, 2014. The entire disclosures of all of the above applications are incorporated herein by reference.

TECHNICAL FIELD

The present disclosure relates to a display device for a vehicle, suitably applied to a combination meter displaying various vehicle information.

BACKGROUND ART

There has been known a conventional vehicle display device disclosed in, for example, Patent Literature 1. The vehicle display device in Patent Literature 1 is a composite display in which a first indicator and a pair of second indicators are put together within a display area.

The first indicator is, for example, a digital indicator displaying information with an image, and is disposed at the center of the display area. The second indicators are analog indicators indicating information by turning of a pointer, and are disposed on the side of a viewer relative to the first indicator on the left and right sides of the first indicator, respectively.

Each of the second indicators has a moving mechanism including a motor, a gear, and the like. Each of the second indicators can move relative to the first indicator between a first position at which a part of each second indicator overlaps with the first indicator but does not interfere with the other second indicator and a second position at which the second indicators are separated from each other without overlapping with the first indicator. Specifically, the second indicators are adapted to move to the left and right sides to be separated from each other from the positions at which the parts of the respective second indicators overlap with the first indicator. Alternatively, the second indicators are adapted to move to the positions at which the parts of the respective second indicators overlap with the first indicator from the positions on the left and right sides at which the second indicators do not overlap with the first indicator.

The second indicators move to the second positions when information on the first indicator is to be preferentially displayed, or move to the first positions when information on each second indicator is to be preferentially displayed.

PRIOR ART LITERATURES

Patent Literature

Patent Literature 1: JP 4418296 B

SUMMARY OF INVENTION

However, the second indicators of the vehicle display device in Patent Literature 1 are actual, substantial indicators and are only allowed to move within a range in which the second indicators do not interfere with each other.

The second indicators merely move left and right without overlapping each other. The second indicators are merely capable of moving left and right, are visually recognized as two indicators by a viewer at all times, and thus are not allowed to have a large change in the whole display.

An object of the present disclosure is to provide a display device allowing for increased layout flexibility when moving an indicator for a vehicle.

Another object of the present disclosure is to provide a display device allowing for a large change in the whole display by changing the appearance and position of a plurality of pointers within a display area for a vehicle.

Still another object of the present disclosure is to provide a display device for a vehicle in which degradation in appearance can be restricted even when ring portions visually recognized as a real image and a virtual image are moved to overlap each other but are substantially misaligned, the degradation in appearance being caused by the misalignment.

According to an aspect of the present disclosure, a display device for a vehicle displaying, within a display area, various pieces of vehicle information associated with vehicle travel for view by a viewer, includes: a first ring portion that forms an outer periphery of a first indicator indicating at least one piece of the various pieces of vehicle information and is visually recognized as a virtual image within the display area; and a moving mechanism that is able to move a position of the first ring portion.

The ring portion is thus visually recognized as the virtual image by a viewer within the display area. As a result, the substantial ring portion does not directly interfere with another member within the display area even when the position of the ring portion is moved by the moving mechanism. The layout flexibility of the ring portion associated with the movement thereof can thus be increased.

According to an aspect of the present disclosure, a display device for a vehicle displaying, within a display area, various pieces of vehicle information associated with vehicle travel for view by a viewer, includes: a first pointer that indicates first vehicle information among the various pieces of vehicle information; a second pointer that indicates second vehicle information among the various pieces of vehicle information; a first light source that is turned on to make the first pointer lit and is turned off to make the first pointer extinguished; a second light source that is turned on to make the second pointer lit and is turned off to make the second pointer extinguished; and a moving mechanism that is able to move a position of at least the first pointer, of the first pointer and the second pointer.

Accordingly, the first vehicle information and second vehicle information can be indicated by the first pointer and second pointer when the two pointers are lit by turning on both the first light source and the second light source. Moreover, for example, only the first vehicle information can be indicated by the first pointer when the first pointer is lit by turning on the first light source, the second pointer is extinguished by turning off the second light source, and the first pointer is moved to a predetermined position by the moving mechanism.

A display mode can thus be switched between a two-pointer mode and a one-pointer mode to be able to change the whole display to a large extent and to be able to have improved design.

According to an aspect of the present disclosure, a display device for a vehicle displaying, within a display area, various pieces of vehicle information associated with vehicle travel for view by a viewer, includes: a first ring portion that forms an outer periphery of a first indicator indicating first vehicle information among the various pieces of vehicle information and is visually recognized as a virtual image within the display area; a second ring portion that forms an outer periphery of a second indicator indicating second vehicle information among the various pieces of vehicle information and is visually recognized as a real image within the display area; an illumination light source that makes either one of the first ring portion and the second ring portion luminous; a moving mechanism that is able to move a position of at least one of the first ring portion and the second ring portion; and a control unit that turns on the illumination light source when the first ring portion and the second ring portion are moved relatively to each other by the moving mechanism to allow the virtual image of the first ring portion and the real image of the second ring portion to overlap each other.

Accordingly, the light source is turned on by the control unit when the virtual image of the first ring portion and the real image of the second ring portion overlap each other. In other words, either one of the ring portions is lit.

One of the ring portions being lit stands out to the viewer when the virtual image of the first ring portion and the real image of the second ring portion overlap each other so that, even when the ring portions are substantially misaligned, the misalignment in some degree can be less conspicuous. The degradation in appearance caused by the misalignment can be restricted as a result.

BRIEF DESCRIPTION OF DRAWINGS

FIG. 11 illustrates a display state when the ignition switch is turned on.

FIG. 12 illustrates an opening mode.

FIG. 13 illustrates how two ring portions move left and right.

FIG. 26 is an explanatory view explaining information displayed within a display area.

DESCRIPTION OF EMBODIMENTS

Figure 1:
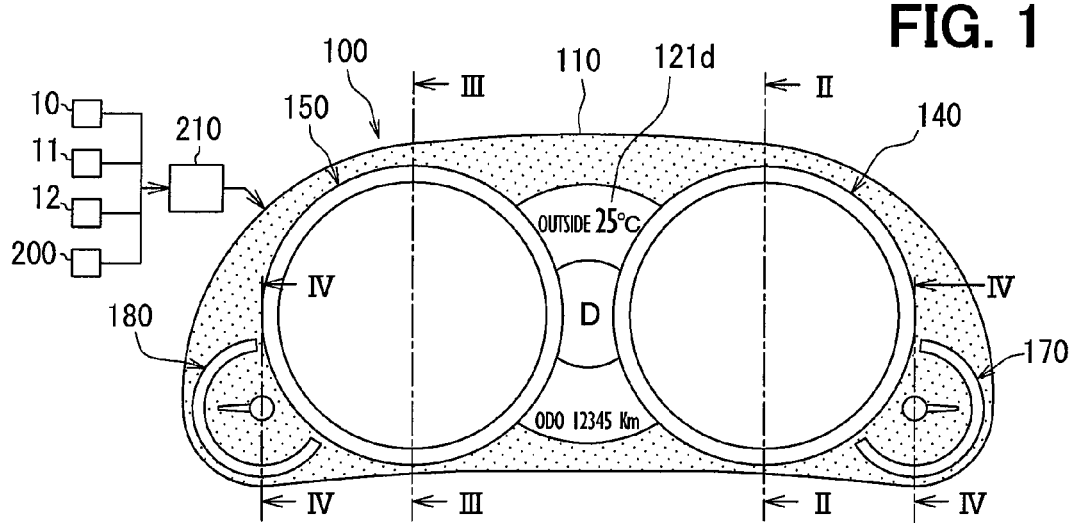
FIG. 1 is a front view of a vehicle display device according to an embodiment.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

A vehicle display device 100 according to an embodiment will be described. The vehicle display device (hereinafter, referred to as a display device) 100 is applied to a combination meter of a vehicle, for example, and is installed at a position facing a viewer (hereinafter, referred to as a driver) on an installment panel. The display device 100 comprehensively displays various pieces of vehicle information associated with vehicle travel within a display area 110 to be viewed by the driver. The display area 110 is an area enclosed with a meter hood and has an oblong shape as viewed from the side of the driver.

As illustrated in FIG. 1, the vehicle includes an ignition switch 10, a selector lever 11 of an automatic transmission, and a detector 12 detecting the state of another vehicle (four-wheeled or two-wheeled), a pedestrian, and the like around the own vehicle. The detector 12 can be, for example, a camera, a millimeter wave radar, a laser radar, or a sonar provided at a predetermined position on the periphery of the exterior of the vehicle.

On and off signals corresponding to turning on and off of the ignition switch 10, a selector signal (such as P, R, N, D, or L) indicating a combination of transmission gears selected by the selector lever 11, a detection signal (such as a position of or a distance to another vehicle) by the detector 12, and the like are output to a control unit 210 which will be described later.

As illustrated in FIGS. 1 to 6, the display device 100 includes a display unit 120, a one-way mirror 130, a first indicator 140, a second indicator 150, a water temperature indicator 170, a fuel indicator 180, a moving unit 190, a selection switch 200, and the control unit 210. The display device 100 also includes, at the center of the display area 110, a third indicator 160 formed of a first ring portion 144 of the first indicator 140 and a second ring portion 153 of the second indicator 150 as will be described in detail later.

The display unit 120 forms various pieces of vehicle information as digital images (121a to 121n and the like) and displays the images on a display surface 121 of the display unit 120, where plural pieces of information to be displayed and a display position (to be described in detail) are switched by the control unit 210. A predetermined color is set to each of the digital images (121a to 121n and the like) formed by the display unit 120. The digital images (121a to 121n and the like) are transmitted through the one-way mirror 130 and are visually recognized as real images by the driver. The display surface 121 is all black when no image is formed by the display unit 120.

The display unit 120 may also form another vehicle information as the digital images (121a to 121n and the like) and display the images on the display surface 121 of the display unit 120, the other vehicle information being different from the vehicle information indicated by the first indicator 140 (a first pointer 145) and the second indicator 150 (a second pointer 154).

The display unit 120 has a flat, oblong rectangular shape, for example, and is disposed within the display area 110 such that the display surface 121 faces the driver, that is, such that the display surface 121 is disposed substantially in the vertical direction. The display unit 120 can be formed of, for example, a liquid crystal display or an organic electroluminescence (EL) display.

The one-way mirror 130 has a transmission function that transmits a part of incident light and a reflection function that reflects a part of the incident light to be able to obtain transmitted light and reflected light that are equal in intensity. The one-way mirror 130 is disposed on the side of the driver relative to the display unit 120. The one-way mirror 130 is a sheet-like mirror having an oblong rectangular shape as viewed from the front. An upper side of the one-way mirror 130 is disposed near an upper side of the display unit 120, and a lower side of the one-way mirror 130 is disposed toward the side of the driver away from a lower side of the display unit 120. In other words, the one-way mirror 130 is disposed such that the lower side thereof is tilted to the side of the driver with respect to the display surface 121. The tilt angle is approximately 45 degrees.

Figure 2:
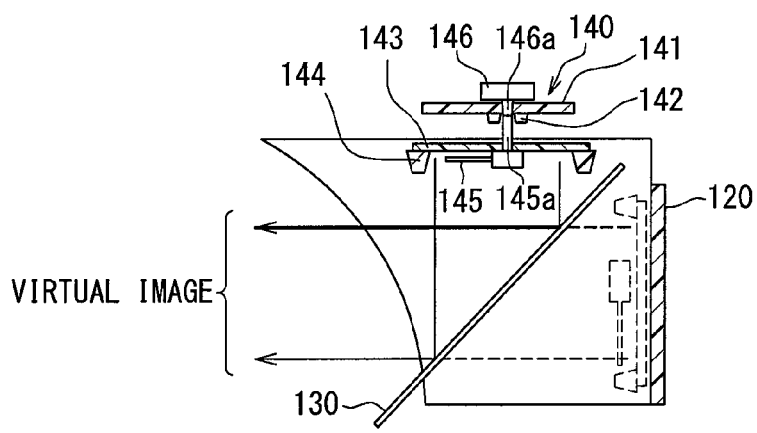
FIG. 2 is a cross-sectional view taken along line II-II in FIG. 1.
Figure 5:
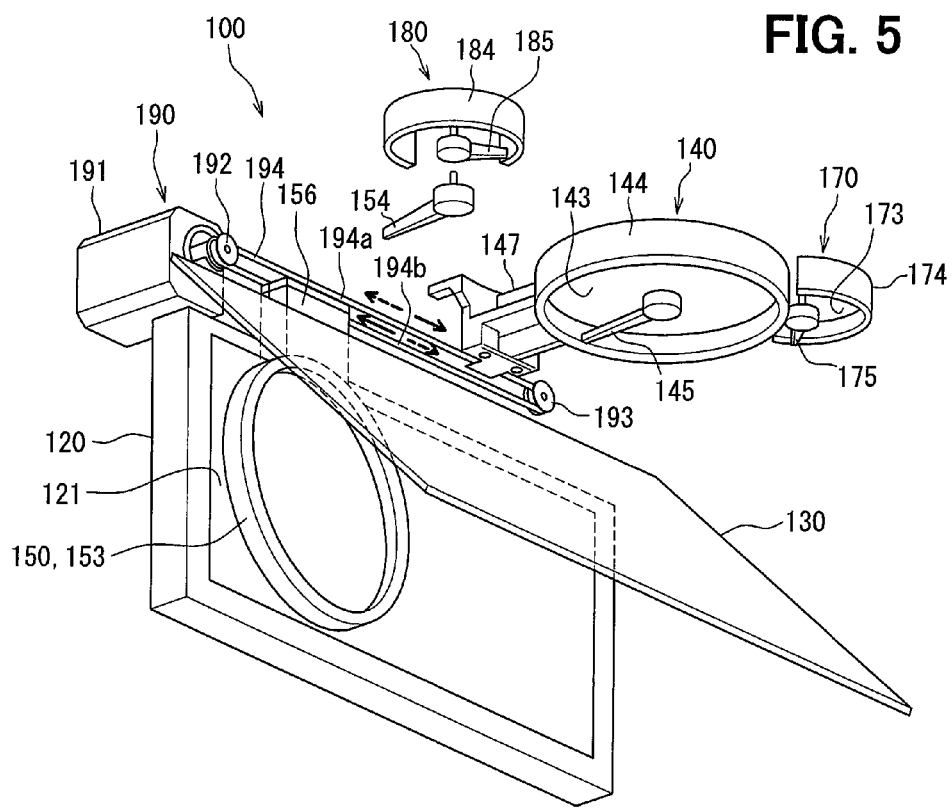
FIG. 5 is an exploded perspective view of the vehicle display device.
Figure 6:
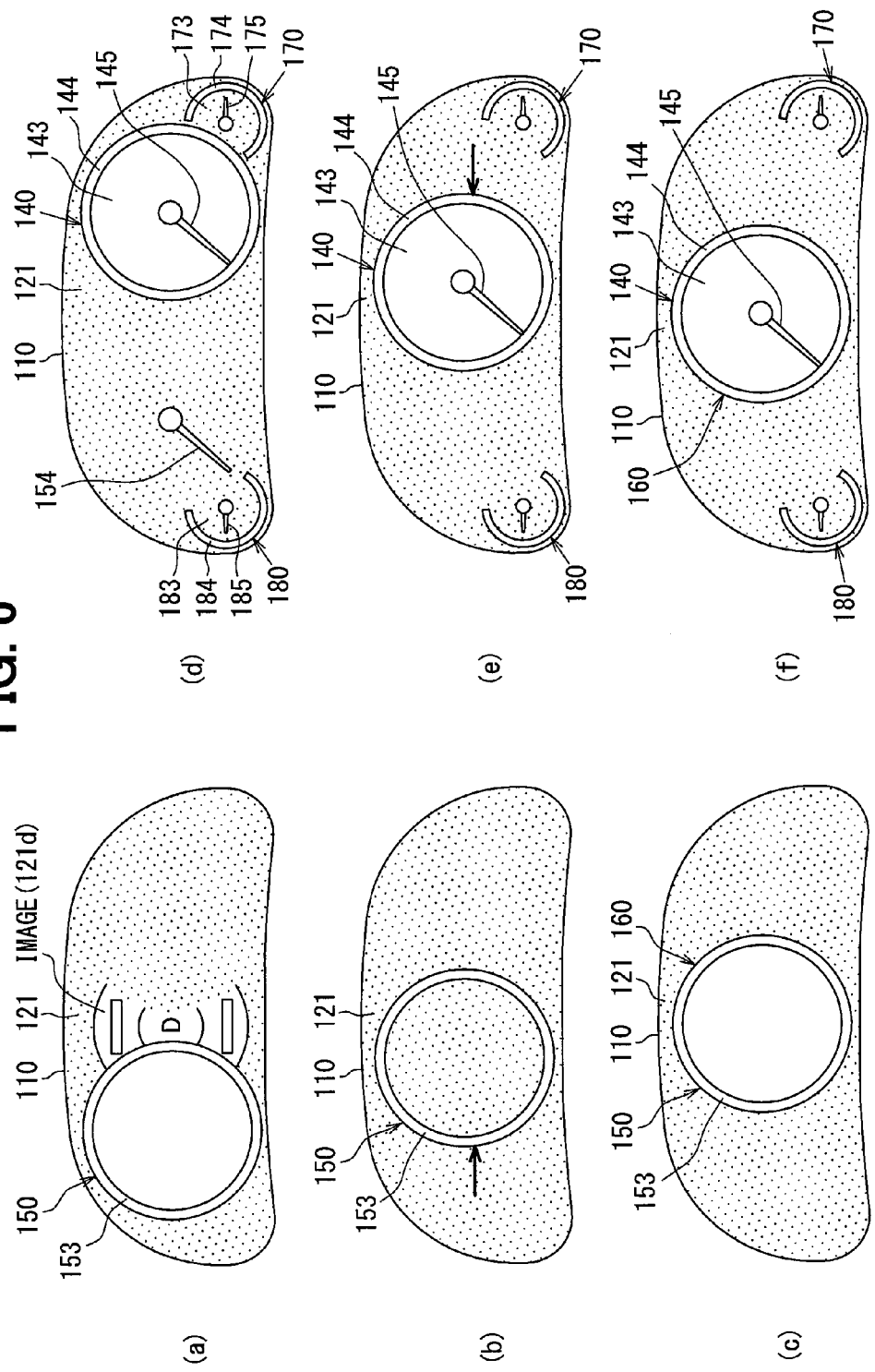
FIG. 6 is an explanatory view explaining information displayed within a display area.

The first indicator 140 is an indicator mainly indicating first vehicle information (vehicle speed) among the various pieces of vehicle information. As illustrated in FIGS. 2 and 5, the first indicator 140 includes a board 141, a light source 142 (i.e., a first light source 142), a dial 143, the first ring portion 144, a pointer 145 (i.e., the first pointer 145), a motor 146, and an arm 147.

The first indicator 140 is disposed in an outer area of the display area 110 as viewed from the driver, specifically, on an upper side of the outer area of the display area 110 and toward the side of the driver relative to the display surface 121 (such a position will be hereinafter referred to as a ceiling side of the display area 110), such that a plate surface of each of the board 141 and the dial 143 is oriented in the horizontal direction. Accordingly, the first indicator 140 (the dial 143, the first ring portion 144, the pointer 145) is positioned on an upper side of the one-way mirror 130 and is reflected off the one-way mirror 130 to be visually recognized as a virtual image by the driver, as illustrated in FIGS. 2, 6(d), 6(e), and 6(f).

The board 141 is made of, for example, a glass epoxy board, and includes an electric circuit for the first indicator 140. The board 141 has a circular shape and is disposed on the ceiling side of the display area 110 such that a plate surface of the board is oriented in the horizontal direction.

The light source 142 is turned on to illuminate the dial 143 and the pointer 145 and is provided at a plurality of sites on a lower surface of the board 141. The light source 142 is turned on to make the dial 143 and the pointer 145 lit, and is turned off to make the dial 143 and the pointer 145 extinguished. The light source 142 can be formed of, for example, a light-emitting diode (LED).

The dial 143 is, for example, a thin, circular plate member made of a light transmissive material (e.g., a transparent polycarbonate resin), and is fixed to the board 141 on a lower side of the board 141 (on the side of the one-way mirror 130) such that a plate surface of the dial 143 is in parallel with the plate surface of the board 141. A numerical portion indicating a vehicle speed value and a scale portion (information of the first vehicle information) are aligned in a circumferential direction on an outer peripheral side of a lower surface (on the side of the one-way mirror 130) of the dial 143. An area excluding the numerical portion and scale portion on the dial 143 is printed/painted (e.g., painted black) to obtain a light-shielding effect.

The first ring portion 144 is a ring member to enhance the appearance of the outer peripheral side of the dial 143 as viewed by the driver. The first ring portion 144 is fixed to the outer periphery of the lower surface (on the side of the one-way mirror 130) of the dial 143. The first ring portion 144 is made of, for example, a resin material, a surface of which is coated with metallic (e.g., silver) paint or plated. The first ring portion 144 is thus visually recognized as though the first ring portion 144 itself gives off light by reflecting external light.

The pointer 145 is made of a light transmissive material (e.g., a transparent polycarbonate resin, an acrylic resin). The pointer 145 is an analog pointer that indicates the vehicle speed value (i.e., the first vehicle information) with a needle portion turning in response to rotation of a shaft 145a passing through the center of the dial 143, the needle portion extending from the shaft 145a to the outer peripheral side of the dial 143.

The motor 146 is a drive unit for turning the pointer 145, and is fixed to an upper surface of the board 141. A shaft 146a of the motor 146 passes through the board 141 to extend to the side of the pointer 145 and to be connected to the shaft 145a.

The arm 147 is a block member connecting the first indicator 140 to the moving unit 190, where one end of the arm 147 is connected to the board 141 or the like while the other end is connected to a belt 194 (an outgoing belt 194a) running horizontally. When the belt 194 is moved with actuation of the moving unit 190, the first indicator 140, that is, the first pointer 145 horizontally moves left and right together with the belt 194 as viewed from the side of the driver. The connection between the arm 147 and the belt 194 will be described in detail later.

Figure 3:
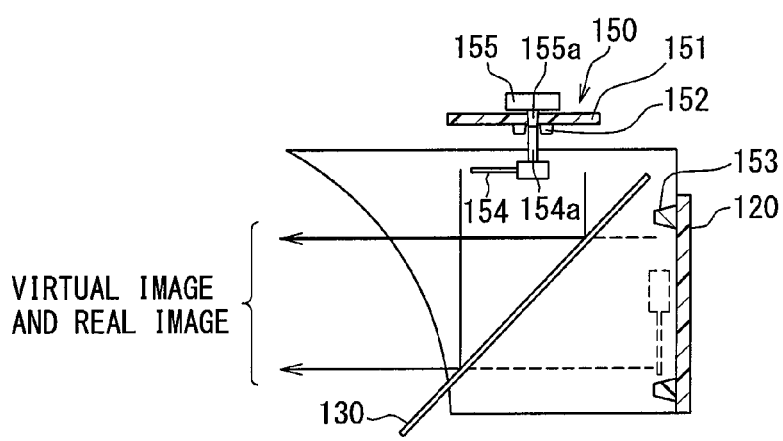
FIG. 3 is a cross-sectional view taken along line III-III in FIG. 1.

The second indicator 150 is an indicator indicating information (e.g., a drive mode, an engine speed, a map) different from the information (i.e., vehicle speed) indicated in the first indicator 140 among the various pieces of vehicle information. As illustrated in FIGS. 3 and 5, the second indicator 150 includes a board 151, a light source 152 (i.e., a second light source 152), the second ring portion 153, the second pointer 154 (a shaft 154a), a motor 155 (a shaft 155a), and an arm 156. The second indicator 150 does not include a member corresponding to the dial 143 of the first indicator 140.

The board 151, the light source 152, the pointer 154, and the motor 155 of the second indicator 150 are disposed on the left side of the ceiling side of the display area 110 as viewed from the driver, where a plate surface of the board 151 is oriented in the horizontal direction. Accordingly, the pointer 154 is positioned on the upper side of the one-way mirror 130 and is reflected off the one-way mirror 130 to be visually recognized as a virtual image by the driver, as illustrated in FIGS. 3 and 6(d).

The second ring portion 153 and the arm 156 of the second indicator 150 are disposed on the side of the driver relative to the display surface 121 and on the left side as viewed from the driver. Accordingly, the second ring portion 153 transmits through the one-way mirror 130 from the side of the display surface 121 to be visually recognized as a real image by the driver, as illustrated in FIGS. 3, 6(a), 6(b), and 6(c).

The various images (121d, 121f, and 121l) for the second indicator 150 are formed on the display surface 121 of the display unit 120 while corresponding to an inner area of the second ring portion 153. The images (121d, 121f, and 121l) transmit through the one-way mirror 130 to be visually recognized as real images by the driver.

The board 151, the light source 152, the pointer 154, and the motor 155 are structured similarly to the board 141, the light source 142, the pointer 145, and the motor 146 of the first indicator 140.

The second light source 152 is turned on to make the second pointer 154 lit, and is turned off to make the second pointer 154 extinguished. The second light source 152 is provided at a plurality of sites on a lower surface of the board 151. The second light source 152 can be formed of, for example, a light-emitting diode (LED).

The second ring portion 153 is a ring member for enhancing the appearance of the outer peripheral side of the second indicator 150 as viewed by the driver. The second ring portion 153 is disposed along the display surface 121 on the side of the driver relative to the display unit 120. The second ring portion 153 is made of, for example, a resin material a surface of which is coated with metallic (e.g., silver) paint or plated. The second ring portion 153 thus appears as though the second ring portion 153 itself gives off light by reflecting external light.

The second pointer 154 is made of a light transmissive material (e.g., a transparent polycarbonate resin, an acrylic resin). The second pointer 154 is an analog pointer that indicates the drive mode (i.e., the second vehicle information) with a needle portion turning in response to rotation of the shaft 154a passing through the center of the board 151, the needle portion extending from the shaft 154a to the outer peripheral side of the board 151. The shaft 154a is connected to the shaft 155a of the motor 155.

The arm 156 is a member connecting the second ring portion 153 to the moving unit 190. The plate-like arm 156 has one end connected to an upper end of the outer periphery of the second ring portion 153, and the other end connected to the belt 194 (a returning belt 194b) running in the horizontal direction. When the belt 194 is moved with the actuation of the moving unit 190, the second ring portion 153 horizontally moves left and right together with the belt 194 as viewed from the side of the driver. The connection between the arm 156 and the belt 194 will be described in detail later.

Figure 4:
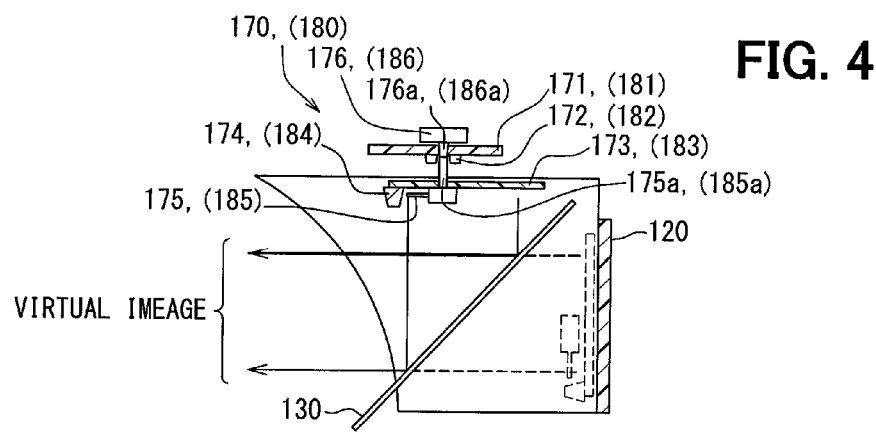
FIG. 4 is a cross-sectional view taken along line IV-IV in FIG. 1.

The water temperature indicator 170 indicates water temperature of an engine coolant, among the various pieces of vehicle information. As illustrated in FIGS. 4 and 5, the water temperature indicator 170 includes a board 171, a light source 172, a dial 173, a ring portion 174, a pointer 175 (a shaft 175a), and a motor 176 (a shaft 176a).

The water temperature indicator 170 is fixedly disposed on the right ceiling side of the display area 110 as viewed from the driver such that a plate surface of each of the board 171 and the dial 173 is oriented in the horizontal direction. Accordingly, the water temperature indicator 170 (the dial 173, the ring portion 174, the pointer 175) is positioned on the upper side of the one-way mirror 130 and is reflected off the one-way mirror 130 to be visually recognized as a virtual image by the driver, as illustrated in FIGS. 4, 6(d), 6(e), and 6(f).

The board 171, the light source 172, the dial 173, the pointer 175, and the motor 176 are structured similarly to the board 141, the light source 142, the dial 143, the pointer 145, and the motor 146 of the first indicator 140.

Note however that the dial 173 is provided with a scale indicating the water temperature. The ring portion 174 is a ring, a part of which in the circumferential direction is cut out, and is fixed to the dial 173. Unlike the first ring portion 144 and the second ring portion 153, the ring portion 174 is made of a light transmissive material, and is lit when the light source 172 is turned on, a surface of the ring portion not having a metallic finish.

The fuel indicator 180 indicates the amount of fuel remaining, among the various pieces of vehicle information. As illustrated in FIGS. 4 and 5, the fuel indicator 180 includes a board 181, a light source 182, a dial 183, a ring portion 184, a pointer 185 (a shaft 185a), and a motor 186 (a shaft 186a).

The fuel indicator 180 is fixedly disposed on the left ceiling side of the display area 110 as viewed from the driver such that a plate surface of each of the board and the dial is oriented in the horizontal direction. Accordingly, the fuel indicator 180 (the dial 183, the ring portion 184, the pointer 185) is positioned on the upper side of the one-way mirror 130 and is reflected off the one-way mirror 130 to be visually recognized as a virtual image by the driver, as illustrated in FIGS. 6(d), 6(e), and 6(f).

The board 181, the light source 182, the dial 183, the ring portion 184, the pointer 185, and the motor 186 of the fuel indicator 180 are structured similarly to the board 171, the light source 172, the dial 173, the ring portion 174, the pointer 175, and the motor 176 of the water temperature indicator 170. Note however that the dial is provided with a scale indicating the amount of fuel remaining.

The moving unit 190 is a moving mechanism for moving the position of the first indicator 140 (the first ring portion 144, first pointer 145) and the position of the second ring portion 153 of the second indicator 150. As illustrated in FIG. 5, the moving unit 190 is disposed on the upper side of the display unit 120 and includes a motor 191, a first pulley 192, a second pulley 193, and the belt 194.

The motor 191 is a drive unit driving (rotating) the first pulley 192 and is disposed at one end of an upper long side of the display unit 120. A shaft (i.e., a rotary shaft) of the motor 191 is disposed in a direction intersecting with (orthogonal to) the display surface 121 of the display unit 120.

The first pulley 192 is fixed to the shaft (i.e., the rotary shaft) of the motor 191. The second pulley 193 is rotatably disposed at another end side of the upper long side of the display unit 120.

The belt 194 runs between the first pulley 192 and the second pulley 193. The belt 194 running between the pulleys 192 and 193 is thus disposed above and in parallel with the upper long side of the display unit 120.

An upper belt of the belt 194 is the outgoing belt 194a, whereas a lower belt of the belt 194 is the returning belt 194b. When the shaft of the motor 191 rotates in a predetermined direction, the outgoing belt 194a moves in a direction indicated by a solid arrow in FIG. 5 (to the right in FIG. 5), whereas the returning belt 194b moves in a direction indicated by a solid arrow in FIG. 5 (to the left in FIG. 5). When the shaft of the motor 191 rotates in a direction counter to the predetermined direction, each of the outgoing belt 194a and the returning belt 194b moves in a direction (indicated by a broken arrow in FIG. 5) opposite to the aforementioned direction.

The first indicator 140 (the first ring portion 144, the first pointer 145) is connected to the outgoing belt 194a via the arm 147. The second ring portion 153 is connected to the returning belt 194b via the arm 156.

When the shaft of the motor 191 rotates in the predetermined direction (e.g., the direction indicated by the solid arrow in FIG. 5) and stops at a first rotational position, the virtual images of the dial 143, the first ring portion 144, and the pointer 145 of the first indicator 140 are visually recognized at a predetermined position on the right side of the display area 110 as illustrated in FIG. 6(d). The real image of the second ring portion 153 of the second indicator 150 is visually recognized at a predetermined position on the left side of the display area 110 as illustrated in FIG. 6(a). At this time, the pointer 154 of the second indicator 150 is visually recognized as a virtual image inside the real image of the second ring portion 153 when the light source 152 is turned on.

On the other hand, when the shaft of the motor 191 rotates in a direction (e.g., the direction indicated by the broken arrow in FIG. 5) counter to the predetermined direction and stops at a second rotational position, the virtual images of the dial 143, the first ring portion 144, and the pointer 145 of the first indicator 140 move from the right side of the display area 110 to the left side of the display area 110 as illustrated in FIG. 6(e) to be visually recognized at the center as illustrated in FIG. 6(f). The real image of the second ring portion 153 of the second indicator 150 moves from the left side of the display area 110 to the right side of the display area 110 as illustrated in FIG. 6(b) to be visually recognized at the center as illustrated in FIG. 6(c).

Upon moving to the center of the display unit 120, the virtual image of the first ring portion 144 and the real image of the second ring portion 153 overlap each other. The overlap between the virtual image of the first ring portion 144 and the real image of the second ring portion 153 forms the third indicator 160 at the center as illustrated in FIGS. 6(c) and 6(f).

The moving unit 190 allows the virtual image of the first pointer 145 to move left and right within the display area 110. Likewise, the moving unit 190 allows the virtual image of the first ring portion 144 and the real image of the second ring portion 153 to move within the display area 110 between the position at which the images are separated left and right by a predetermined distance and the position at which the images overlap each other at the center. Hereinafter, a positional relationship in which the virtual image of the first ring portion 144 and the real image of the second ring portion 153 are separated by the predetermined distance will be referred to as a "two-ring" positional relationship, while a positional relationship in which the images overlap each other will be referred to as a "one-ring" positional relationship.

The selection switch 200 is manually operated by the driver who is to switch a display mode of the display device 100 according to his/her preference, and outputs, to the control unit 210, a switch signal obtained in switching the display mode to any mode as illustrated in FIG. 1. The display mode includes, for example, a normal mode, a tachometer-speedometer mode, a sport mode, and a navigation mode. Each mode will be described in detail later.

The control unit 210 performs control to form an image on the display unit 120, control to turn on each of the light sources 142, 152, 172, and 182, control to turn each of the pointers 145, 154, 175, and 185, and control to actuate the moving unit 190, on the basis of the on and off signals from the ignition switch 10, the selector signal from the selector lever 11, the detection signal from the detector 12, the switch signal from the selection switch, and a sensor signal from various sensors sensing a state of travel (the details of control will be described later).

Figure 7:
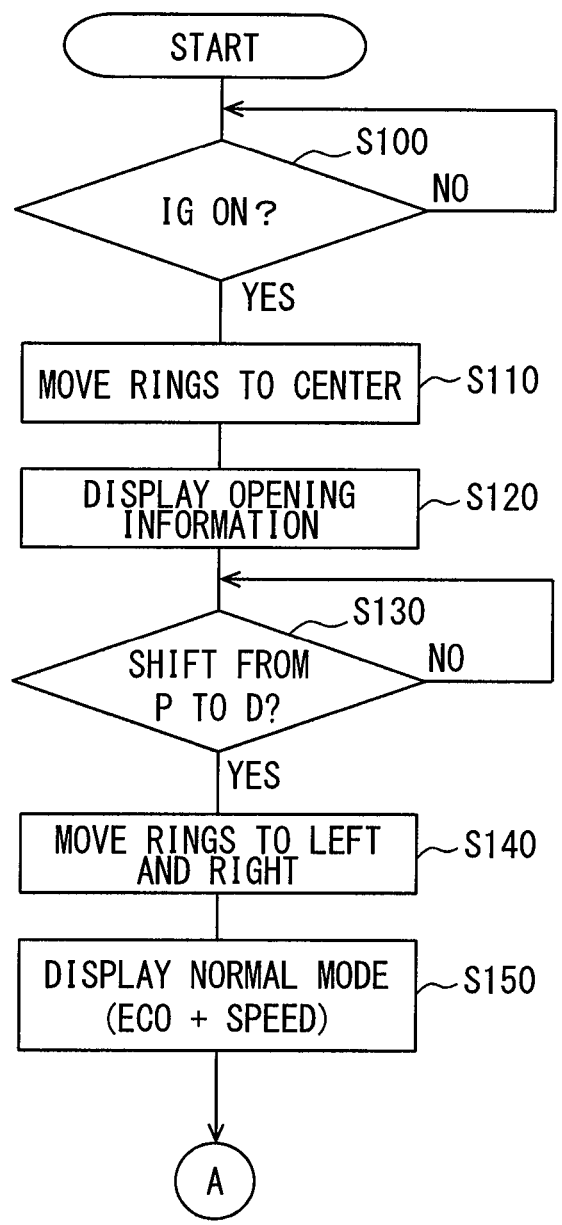
FIG. 7 is a flowchart of display control performed by the vehicle display device.
Figure 8:
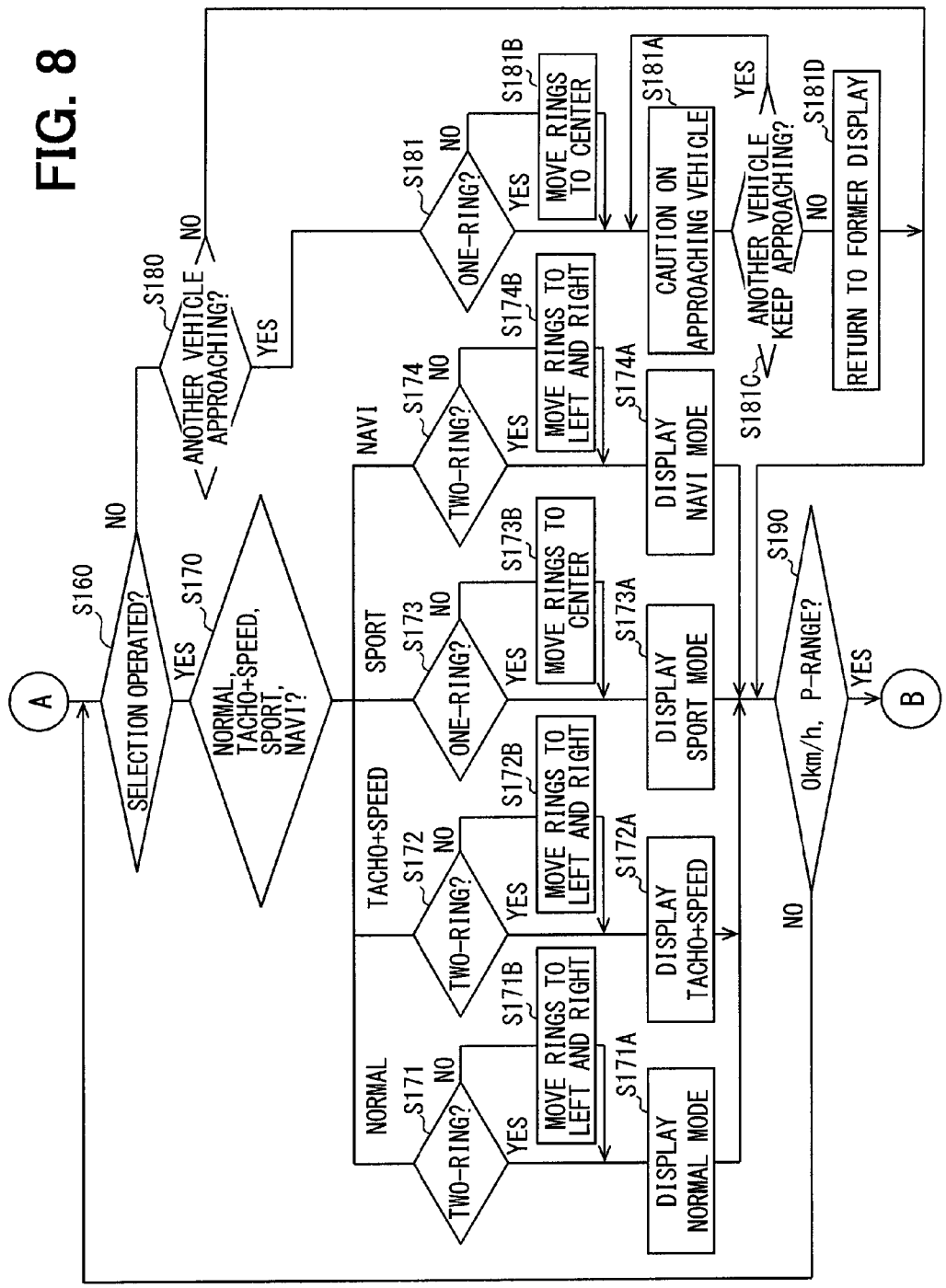
FIG. 8 is a flowchart of the display control performed by the vehicle display device.
Figure 9:
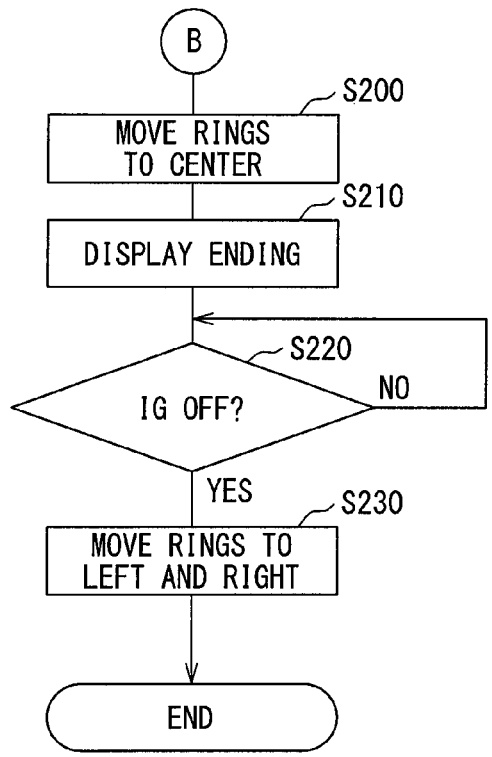
FIG. 9 is a flowchart of the display control performed by the vehicle display device.

The operation of the display device 100 based on the aforementioned configuration will now be described with reference to flowcharts in FIGS. 7 to 9 illustrating display control as well as FIGS. 10 to 23 illustrating various display states.

Figure 10:
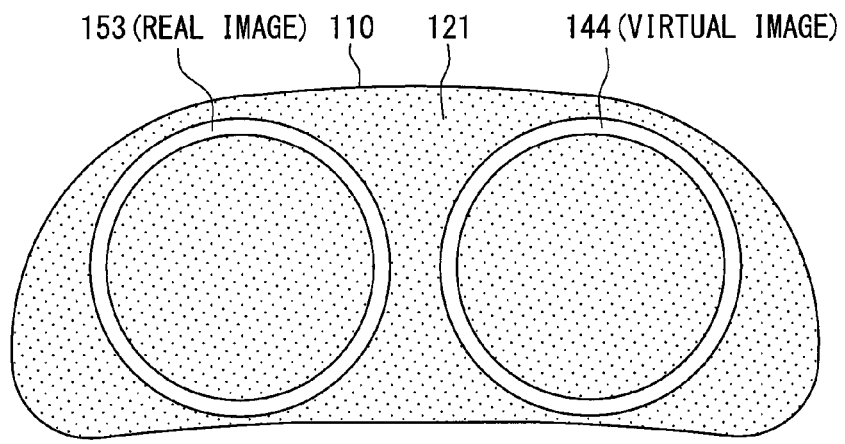
FIG. 10 illustrates a display state when an ignition switch is turned off.

With the ignition switch 10 turned off, the control unit 210 first performs control such that the "two-ring" positional relationship between the virtual image of the first ring portion 144 and the real image of the second ring portion 153 as illustrated in FIG. 10 is maintained by the moving unit 190. The display unit 120 is turned off (i.e., no image is formed thereon), each of the light sources 142, 152, 172, and 182 is turned off, and each of the pointers 145, 154, 175, and 185 is at rest.

Under such conditions, the display surface 121 of the display unit 120 is all black so that the driver visually recognizes the virtual image of the first ring portion 144 and the real image of the second ring portion 153 disposed left and right within the display area 110 and illuminated by the metallic surface treatment on the ring portions.

Then in step S100, the control unit 210 determines whether the ignition switch 10 is turned on. Upon detecting the on signal and determining that the ignition switch 10 is turned on, the control unit 210 in step S110 actuates the motor 191 of the moving unit 190 to bring the virtual image of the first ring portion 144 and the real image of the second ring portion 153 into the "one-ring" positional relationship. In other words, as described with reference to FIG. 5, the belt 194 (194a, 194b) is driven in the direction indicated by the broken arrow in FIG. 5 to cause the virtual image of the first ring portion 144 and the real image of the second ring portion 153 to move to the center of the display area 110 (FIG. 11) and to overlap each other. The third indicator 160 is formed at the center of the display area 110 as a result.

In step S120, the control unit 210 performs display in the opening mode as illustrated in FIG. 12. The opening mode causes the display unit 120 to form and display an information image 121a at a position corresponding to the third indicator 160 and information images 121b and 121c at positions corresponding to left and right sides of the third indicator 160. The information images 121a, 121b, and 121c are visually recognized as real images on the display surface 121 through the one-way mirror 130.

The information image 121a displays information such as an outside air temperature (e.g., 25° C.), a selector position (e.g., P), a vehicle speed (e.g., 0 km/h), and a distance traveled (e.g., 12345 km). The information image 121*b* displays, for example, a local weather forecast for the day. The information image 121*c* displays, for example, information associated with an operating state of multimedia (e.g., a digital versatile disc (DVD), a compact disc (CD)).

In step S130, the control unit 210 determines whether the selector lever 11 is shifted to result in a change of the selector signal from P (park) to D (drive). The processing proceeds to step S140 when the determination is affirmative.

In step S140, the control unit 210 actuates the motor 191 of the moving unit 190 to bring the virtual image of the first ring portion 144 and the real image of the second ring portion 153 into the "two-ring" positional relationship as illustrated in FIG. 13. In other words, as described with reference to FIG. 5, the belt 194 (194*a*, 194*b*) is driven in the direction indicated by the solid arrow in FIG. 5 to cause the virtual image of the first ring portion 144 and the real image of the second ring portion 153 to move left and right within the display area 110 and to reach predetermined left and right positions.

The display unit 120 stops forming the images 121*a*, 121*b*, and 121*c*, each of the light sources 142, 152, 172, and 182 stays turned off, and each of the pointers 145, 154, 175, and 185 stays at rest. Accordingly, only the two ring portions 144 and 153 are visually recognized on the display surface 121 being the black ground.

Figure 14:
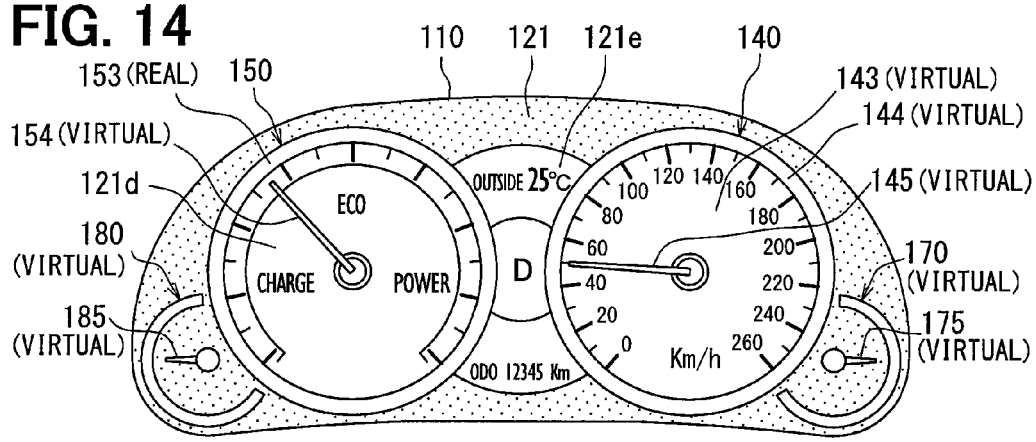
FIG. 14 illustrates a normal mode.

In step S150, the control unit 210 performs display in the normal mode. The normal mode displays the vehicle speed in the first indicator 140 and the drive mode in the second indicator 150 in the "two-ring" positional relationship, as illustrated in FIG. 14. The drive mode indicates whether a current driving state corresponds to an ECO mode with an emphasis on fuel economy, a POWER mode with an emphasis on drive, or a CHARGE mode exploiting an engine brake at the time of deceleration.

The control unit 210 controls the first indicator 140 such that the light source 142 is turned on, the pointer 145 is actuated, and virtual images of the dial 143, the first ring portion 144, and the pointer 145 are displayed through the one-way mirror 130. The control unit 210 also controls the second indicator 150 such that the light source 152 is turned on, the pointer 154 is actuated, and a drive mode image 121*d* is formed in the display unit 120 at a position corresponding to the second ring portion 153. As a result, the real image of the second ring portion 153, the virtual image of the pointer 154, and the real image of the drive mode image 121*d* are displayed in the second indicator 150.

The control unit 210 controls the water temperature indicator 170 such that the light source 172 is turned on, the pointer 175 is actuated, and virtual images of the dial 173, ring portion 174, and pointer 175 are displayed through the one-way mirror 130. Likewise, the control unit 210 controls the fuel indicator 180 such that the light source 182 is turned on, the pointer 185 is actuated, and virtual images of the dial 183, ring portion 184, and pointer 185 are displayed through the one-way mirror 130.

In addition, the control unit 210 causes the display unit 120 to form an information image 121*e* at a position between the virtual image of the first ring portion 144 and the real image of the second ring portion 153. The information image 121*e* displays information such as the outside air temperature (e.g., 25° C.), the selector position (e.g., D), and the distance traveled (e.g., 12345 km). The information image 121*e* is displayed as a real image on the display surface 121 through the one-way mirror 130.

In step S160, the control unit 210 determines whether the selection switch 200 is operated by the driver. The control unit 210 makes the determination on the basis of the presence or absence of the switch signal from the selection switch 200. The processing proceeds to step S170 when the determination in step S160 is affirmative.

In step S170, it is determined which of the normal mode, the tachometer-speedometer mode, the sport mode, and the navigation mode the switch signal from the selection switch 200 corresponds to.

When determining in step S170 that the signal corresponds to the normal mode, the control unit 210 determines in step S171 whether the virtual image of the first ring portion 144 and the real image of the second ring portion 153 are in the "two-ring" positional relationship. When the determination is affirmative, the control unit 210 in step S171A performs the display in the normal mode (FIG. 14) as described in step S150. When the determination in step S171 is negative, the control unit 210 in step S171B actuates the moving unit 190 such that the virtual image of the first ring portion 144 and the real image of the second ring portion 153 are in the "two-ring" positional relationship. Step S171A is performed after that.

When determining in step S170 that the signal corresponds to the tachometer-speedometer mode, the control unit 210 determines in step S172 whether the virtual image of the first ring portion 144 and the real image of the second ring portion 153 are in the "two-ring" positional relationship. The control unit 210 performs display in the tachometer-speedometer mode in step S172A when the determination is affirmative.

Figure 15:
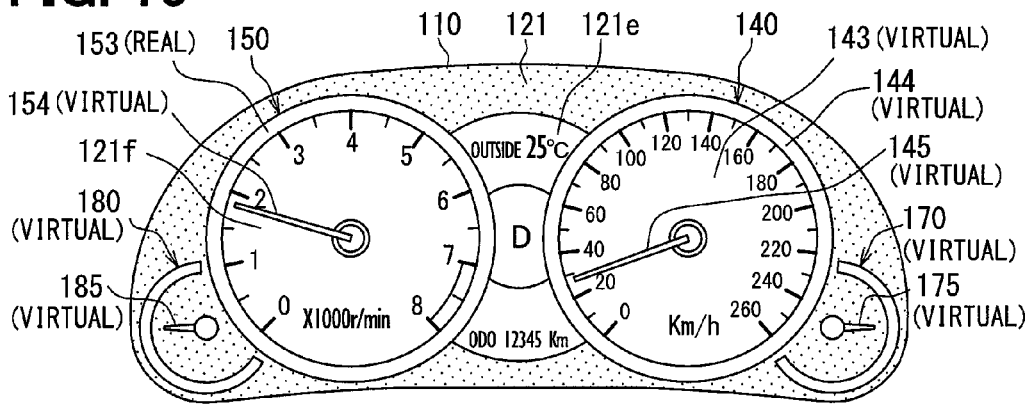
FIG. 15 illustrates a tachometer-speedometer mode.

The tachometer-speedometer mode displays the vehicle speed in the first indicator 140 and the engine speed in the second indicator 150 in the "two-ring" positional relationship, as illustrated in FIG. 15.

The control unit 210 controls the first indicator 140 such that the light source 142 is turned on, the pointer 145 is actuated, and the virtual images of the dial 143, the first ring portion 144, and the pointer 145 are displayed through the one-way mirror 130. The control unit 210 also controls the second indicator 150 such that the light source 152 is turned on, the pointer 154 is actuated, and a tachometer image 121*f* is formed in the display unit 120 at a position corresponding to the second ring portion 153. As a result, the real image of the second ring portion 153, the virtual image of the pointer 154, and a real image of the tachometer image 121*f* are displayed in the second indicator 150.

As with step S171A, the control unit 210 controls the water temperature indicator 170 such that the light source 172 is turned on, the pointer 175 is actuated, and the virtual images of the dial 173, the ring portion 174, and the pointer 175 are displayed through the one-way mirror 130. Likewise, the control unit 210 controls the fuel indicator 180 such that the light source 182 is turned on, the pointer 185 is actuated, and virtual images of the dial 183, the ring portion 184, and the pointer 185 are displayed through the one-way mirror 130.

In addition, as with step S171A, the control unit 210 causes the display unit 120 to form the information image 121*e* at the position between the virtual image of the first ring portion 144 and the real image of the second ring portion 153. The information image 121*e* is displayed as the real image on the display surface 121 through the one-way mirror 130.

When the determination in step S172 is negative, the control unit 210 in step S172B brings the virtual image of the first ring portion 144 and the real image of the second ring portion 153 into the "two-ring" positional relationship and then performs the processing in step S172A.

Figure 16:
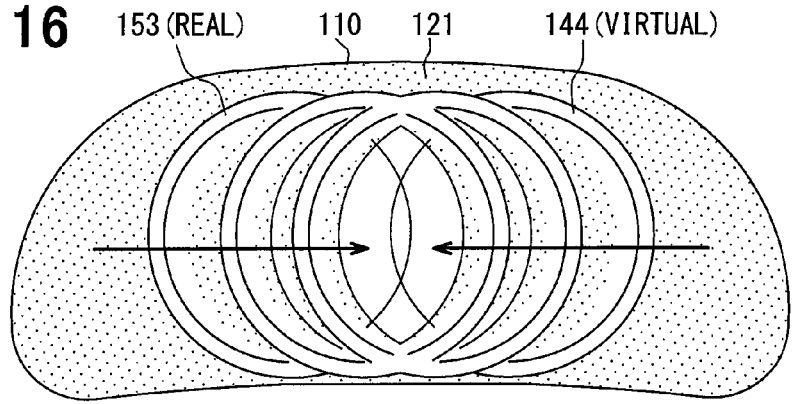
FIG. 16 illustrates how the two ring portions move to a center.

When determining in step S170 that the signal corresponds to the sport mode, the control unit 210 determines in step S173 whether the virtual image of the first ring portion 144 and the real image of the second ring portion 153 are in the "one-ring" positional relationship. The control unit 210 performs display in the sport mode in step S173A when the determination is affirmative. When the determination in step S173 is negative, the control unit 210 in step S173B brings the virtual image of the first ring portion 144 and the real image of the second ring portion 153 into the "one-ring" positional relationship and then performs the processing in step S173A. FIG. 16 illustrates the display state pertaining to step S173B, in which the control unit 210 performs control in the same manner as that described in step S110.

Figure 17:
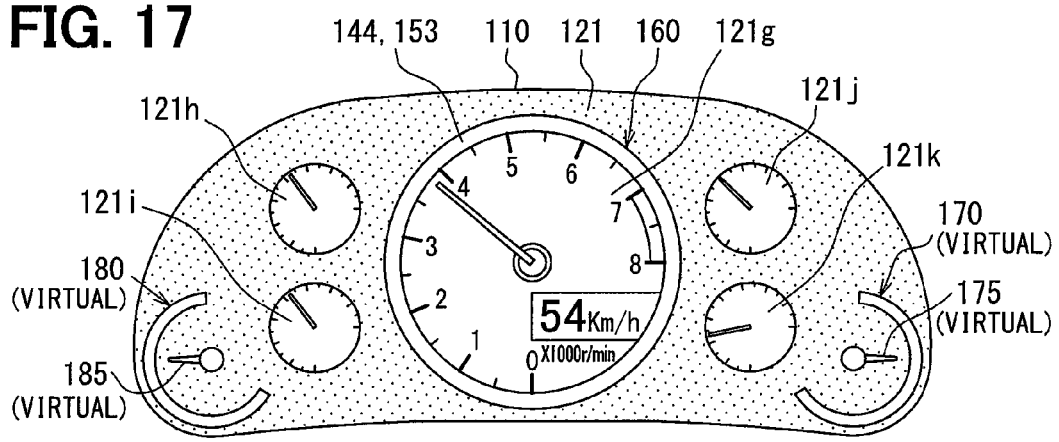
FIG. 17 illustrates a sport mode.

As illustrated in FIG. 17, the sport mode in step S173A displays the engine speed (indicated by the pointer) and the vehicle speed (displayed digitally) in the ring portion (i.e., the third indicator 160) overlapping at the center of the display area 110 in the "one-ring" positional relationship.

The control unit 210 controls the first indicator 140 such that the light source 142 is turned off and actuation of the pointer 145 is stopped. The control unit 210 also controls the second indicator 150 such that the light source 152 is turned off and the pointer 154 is at rest. The control unit 210 also causes the display unit 120 to form a sport meter image 121g at a position within the ring portion (i.e., the third indicator 160) overlapping at the center. The sport meter image 121g displays images of all of a tachometer scale portion, a numerical portion, a tachometer pointer, and a speed value. The sport meter image 121g is displayed as a real image on the display surface 121 through the one-way mirror 130.

Moreover, in the sport mode, the control unit 210 causes the display unit 120 to form a boost pressure display image 121h and a battery voltage display image 121i at a position corresponding to the left side of the ring portion (i.e., the third indicator 160) overlapping at the center. The control unit 210 further causes the display unit 120 to form an oil pressure display image 121j and an oil temperature display image 121k at a position corresponding to the right side of the ring portion (i.e., the third indicator 160) overlapping at the center. Each of the images 121h, 121i, 121j, and 121k is displayed as a real image on the display surface 121 through the one-way mirror 130.

As with step S171A, the control unit 210 controls the water temperature indicator 170 such that the light source 172 is turned on, the pointer 175 is actuated, and the virtual images of the dial 173, the ring portion 174, and the pointer 175 are displayed through the one-way mirror 130. Likewise, the control unit 210 controls the fuel indicator 180 such that the light source 182 is turned on, the pointer 185 is actuated, and the virtual images of the dial 183, the ring portion 184, and the pointer 185 are displayed through the one-way mirror 130.

When determining in step S170 that the signal corresponds to the navigation mode, the control unit 210 determines in step S174 whether the virtual image of the first ring portion 144 and the real image of the second ring portion 153 are in the "two-ring" positional relationship. The control unit 210 performs display in the navigation mode in step S174A when the determination is affirmative.

Figure 19:
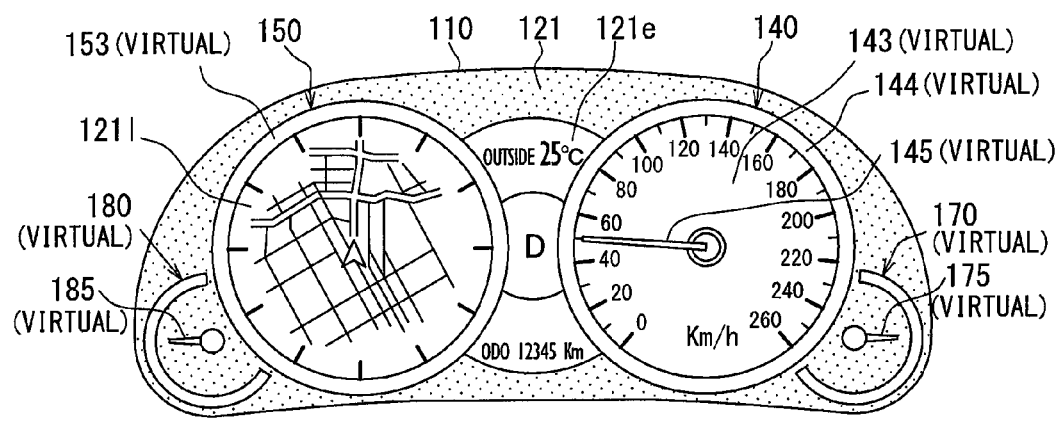
FIG. 19 illustrates a navigation mode.

The navigation mode displays the vehicle speed in the first indicator 140 and navigation information in the second indicator 150 in the "two-ring" positional relationship, as illustrated in FIG. 19.

The control unit 210 controls the first indicator 140 such that the light source 142 is turned on, the pointer 145 is actuated, and the virtual images of the dial 143, the first ring portion 144, and the pointer 145 are displayed through the one-way mirror 130. The control unit 210 also controls the second indicator 150 such that the light source 152 is turned off, the pointer 154 is at rest, and a navigation image 121*l* is formed in the display unit 120 at a position corresponding to the second ring portion 153. The navigation image 121*l* displays own vehicle position information on a map or displays guidance information that guides the driver to a destination, for example. As a result, the real image of the second ring portion 153 and the real image of the navigation image 121*l* are displayed in the second indicator 150.

As with step S171A, the control unit 210 controls the water temperature indicator 170 such that the light source 172 is turned on, the pointer 175 is actuated, and the virtual images of the dial 173, the ring portion 174, and the pointer 175 are displayed through the one-way mirror 130. Likewise, the control unit 210 controls the fuel indicator 180 such that the light source 182 is turned on, the pointer 185 is actuated, and the virtual images of the dial 183, the ring portion 184, and the pointer 185 are displayed through the one-way mirror 130.

In addition, as with step S171A, the control unit 210 causes the display unit 120 to form the information image 121e at the position between the virtual image of the first ring portion 144 and the real image of the second ring portion 153. The information image 121e is displayed as the real image on the display surface 121 through the one-way mirror 130.

Figure 18:
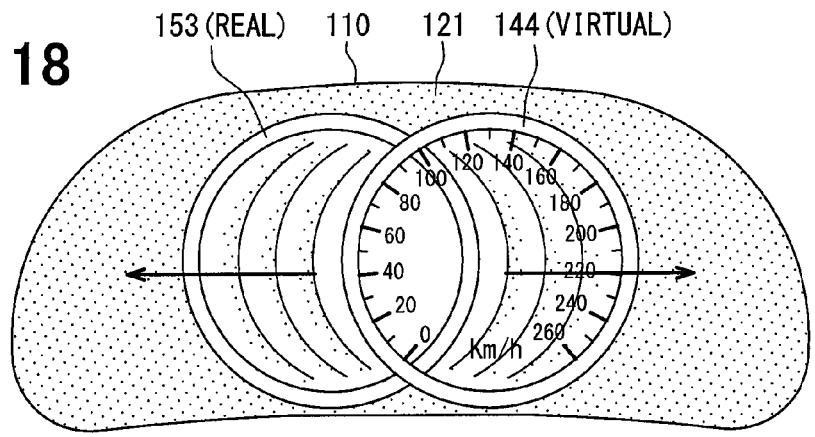
FIG. 18 illustrates how the two ring portions move left and right.

When the determination in step S174 is negative, the control unit 210 in step S174B brings the virtual image of the first ring portion 144 and the real image of the second ring portion 153 into the "two-ring" positional relationship and then performs the processing in step S174A. FIG. 18 illustrates the display state pertaining to step S174B, in which the control unit 210 performs control in the same manner as that described in step S140.

The control to switch the display based on the operation on the selection switch 200 is repeated between step S160 described above and step S190 to be described later.

On the other hand, the processing proceeds to step S180 when the determination in step S160 is negative. In step S180, the control unit 210 determines whether another vehicle, a pedestrian or the like is approaching the own vehicle, on the basis of the detection signal from the detector 12. It is determined that another vehicle is approaching the own vehicle when the other vehicle is detected at a position within a predetermined distance to the own vehicle.

When the determination in step S180 is affirmative, the control unit 210 determines in step S181 whether the virtual image of the first ring portion 144 and the real image of the second ring portion 153 are in the "one-ring" positional relationship and, when making an affirmative determination, displays a caution on the approaching vehicle in step S181A. When the determination in step S181 is negative, the control unit 210 in step S181B brings the virtual image of the first ring portion 144 and the real image of the second ring portion 153 into the "one-ring" positional relationship and then performs the processing in step S181A.

Figure 20:
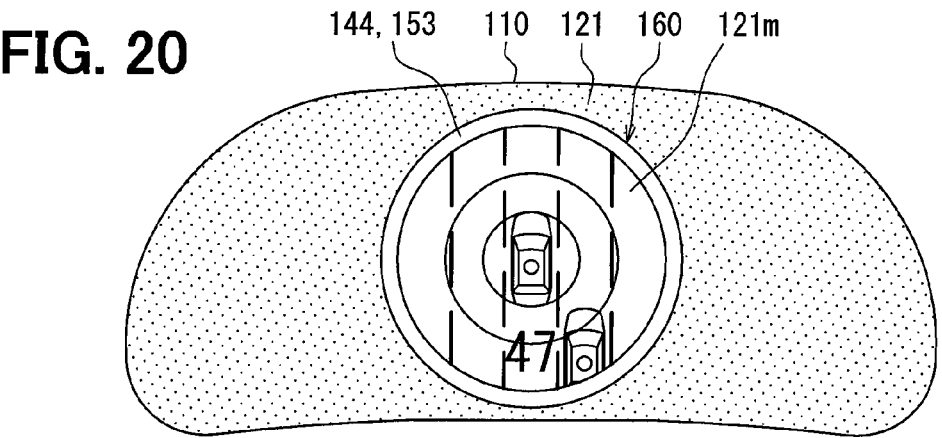
FIG. 20 illustrates an approaching vehicle caution mode.

As illustrated in FIG. 20, the caution display on the approaching vehicle in step S181A displays a positional relationship between the own vehicle and the other vehicle within the ring portion (i.e., the third indicator 160) overlapping at the center of the display area 110 in the "one-ring" positional relationship.

The control unit 210 controls the first indicator 140 such that the light source 142 is turned off and the pointer 145 is at rest. The control unit 210 also controls the second indicator 150 such that the light source 152 is turned off and the pointer 154 is at rest. The control unit 210 also causes the display unit 120 to form an approaching vehicle image 121*m* at a position within the ring portion (i.e., the third indicator 160) overlapping at the center. The approaching vehicle image 121*m* displays the own vehicle at the center and the position of the other vehicle with respect to the own vehicle. The vehicle speed value is displayed below the own vehicle. The approaching vehicle image 121*m* is displayed as a real image on the display surface 121 through the one-way mirror 130.

The control unit 210 controls the water temperature indicator 170 such that the light source 172 is turned off, the pointer 175 is at rest, and the water temperature indicator 170 is not displayed. Likewise, the control unit 210 controls the fuel indicator 180 such that the light source 182 is turned off, the pointer 185 is at rest, and the fuel indicator 180 is not displayed.

In step S181C, the control unit 210 determines whether the other vehicle keeps approaching. The control unit 210 continues performing step S181A when determining that the other vehicle keeps approaching. When it is determined the other vehicle stops approaching, the processing proceeds to step S181D. The control unit 210 switches the display mode to one before the caution display on the approaching vehicle is performed (step S181A).

The caution display on the approaching vehicle based on the detection signal from the detector 12 is repeated between step S180 described above and step S190 to be described later.

After steps S171A, S172A, S173A, S174A, S180 (negative determination), and S181D, the processing proceeds to step S190, in which the control unit 210 determines whether the vehicle speed is 0 km/h and the selector signal is "P". In other words, the control unit 210 determines whether the vehicle comes to a stop and is shifted to park by the selector lever 11.

The processing returns to step S160 when the control unit 210 makes a negative determination in step S190, or proceeds to step S200 when the control unit 210 makes an affirmative determination in step S190. As with step S110, the control unit 210 in step S200 actuates the motor 191 of the moving unit 190 to bring the virtual image of the first ring portion 144 and the real image of the second ring portion 153 into the "one-ring" positional relationship.

Figure 21:
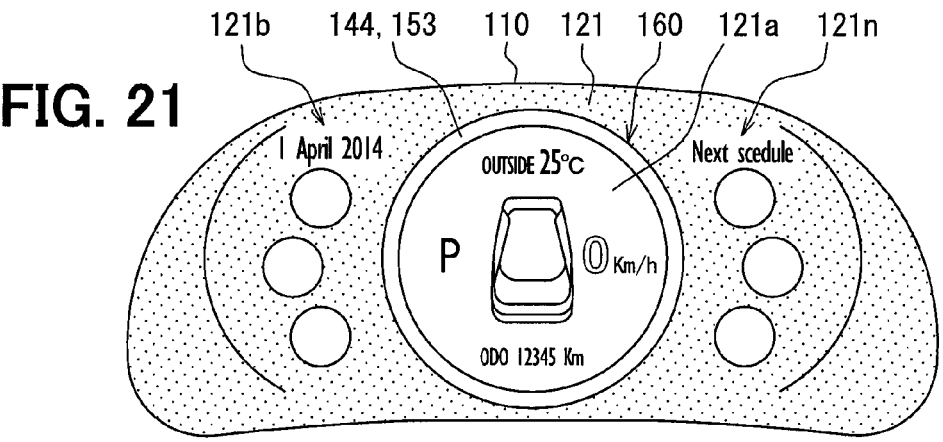
FIG. 21 illustrates an ending mode.

In step S210, the control unit 210 performs display in the ending mode as illustrated in FIG. 21. As with the display in the opening mode in step S120, the ending mode causes the display unit 120 to form and display the information image 121*a* at the position corresponding to the third indicator 160 and the information images 121*b* and 121*n* at the positions corresponding to the left and right sides of the third indicator 160. The information images 121*a*, 121*b*, and 121*n* are visually recognized as real images on the display surface 121 through the one-way mirror 130.

The information images 121*a* and 121*b* are identical to the images displayed in the opening mode in step S120. The information image 121*n* displays schedule information from that point on.

Figure 22:
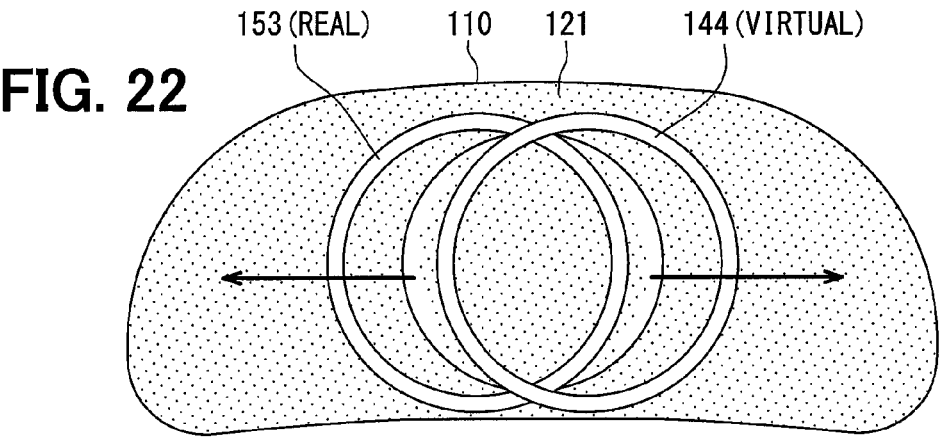
FIG. 22 illustrates how the two ring portions move left and right.
Figure 23:
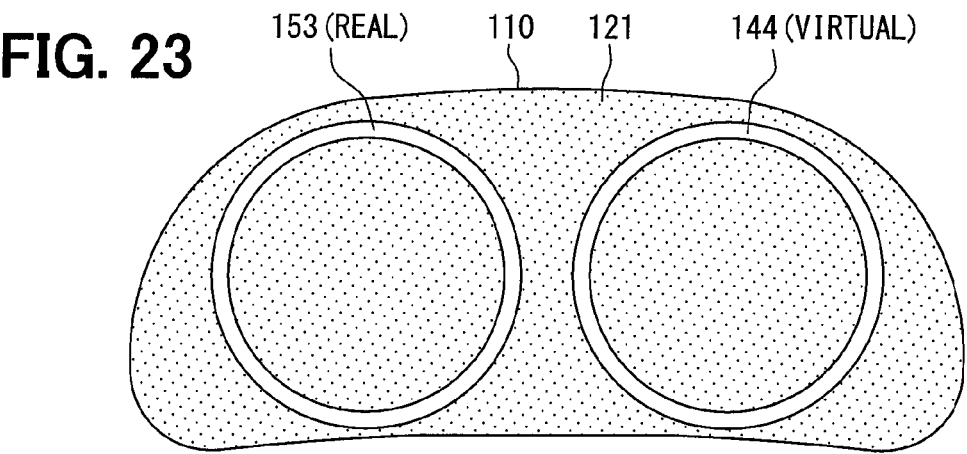
FIG. 23 illustrates an initial state.

Upon determining in step S220 that the ignition switch 10 is turned off, the control unit 210 in step S230 actuates the motor 191 of the moving unit 190 to bring the virtual image of the first ring portion 144 and the real image of the second ring portion 153 into the "two-ring" positional relationship as illustrated in FIGS. 22 and 23.

According to the embodiment, the first ring portion 144 making up the first indicator 140 is disposed in the outer area (ceiling part) of the display area 110 and is displayed as the virtual image through the one-way mirror 130. In addition, the position of the first ring portion 144 is moved by the moving unit 190.

As a result, the substantial first ring portion 144 does not directly interfere with another member within the display area 110 even when the position of the first ring portion 144 is moved by the moving unit 190. Layout flexibility of the first ring portion 144 (the first indicator 140) associated with the movement thereof can thus be increased.

Moreover, the embodiment provides the second ring portion 153 making up the outer periphery of the second indicator 150 that is different from the first indicator 140. The second ring portion 153 is displayed as the real image through the one-way mirror 130. As the first ring portion 144 is moved by the moving unit 190, the virtual image of the first ring portion 144 and the real image of the second ring portion 153 can be moved between the position at which the two images overlap each other (i.e., the one-ring positional relationship) and the position at which the two images are separated by a predetermined distance (i.e., the two-ring positional relationship).

As a result, the virtual image of the first ring portion 144 and the real image of the second ring portion 153 overlapping each other can form the indicator (i.e., the third indicator 160) including one ring portion. The virtual image of the first ring portion 144 and the real image of the second ring portion 153 being separated from each other by the predetermined distance can form the two indicators 140 and 150 including the two ring portions 144 and 153. The whole display can thus be changed to a large extent to be able to improve visibility, legibility and design.

Moreover, according to the embodiment, the moving unit 190 includes the motor 191, the pulleys 192 and 193, and the belt 194. The first ring portion 144 is connected to the belt 194 on the outgoing side (i.e., the outgoing belt 194*a*), whereas the second ring portion 153 is connected to the belt 194 on the returning side (i.e., the returning belt 194*b*).

The first ring portion 144 and the second ring portion 153 can thus be moved simultaneously by using the one motor 191 and the one belt 194.

Moreover, the embodiment provides the first pointer 145 indicating the first vehicle information among the various pieces of vehicle information, the second pointer 154 indicating the second vehicle information among the various pieces of vehicle information, the first light source 142 being turned on to make the first pointer 145 lit and being turned off to make the pointer extinguished, the second light source 152 being turned on to make the second pointer 154 lit and being turned off to make the pointer extinguished, and the moving unit (moving means) 190 that can move the position of at least the first pointer 145 of the first and second pointers 145 and 154. The first pointer 145 and the second pointer 154 are disposed in the outer area of the display area 110 and are visually recognized as the virtual images through the one-way mirror 130.

As a result, the first vehicle information and second vehicle information can be indicated by the first pointer 145 and second pointer 154 as illustrated in FIG. 14, for example, when the two pointers 145 and 154 are lit by turning on both the first light source 142 and the second light source 152.

The first pointer 145 is provided with the dial 143 indicating the first vehicle information. The dial 143 can be moved together with the first pointer 145 by the moving unit 190. The dial 143 therefore accompanies the first pointer 145.

Moreover, the embodiment provides the display unit 120 that can form an image of another vehicle information different from the first vehicle information and the second vehicle information. Accordingly, entirely different vehicle information can be displayed alone by stopping the display of the vehicle information in the first indicator 140 and the display of the vehicle information in the second indicator 150 as illustrated in FIG. 12 (FIG. 21) and FIGS. 17 and 20, for example, when the first light source 142 and the second light source 152 are both turned off to make the first pointer 145, the dial 143, and the second pointer 154 extinguished and the display unit 120 forms the image of the other vehicle information at the center of the display surface 121.

The second indicator 150 can also change the vehicle information displayed therein as illustrated in FIGS. 15 and 19, for example, when the first light source 142 is turned on to make the first pointer 145 and the dial 143 lit, the second light source 152 is turned off to make the second pointer 154 extinguished, and the display unit 120 forms the image of the other vehicle information on the display surface 121 at the position corresponding to the second pointer 154.

The embodiment can switch between a two-pointer mode in which two pieces of vehicle information can be indicated by the first pointer 145 and the second pointer 154, and a one-pointer mode in which one piece of vehicle information can be indicated by the first pointer 145. Moreover, the vehicle information can be changed when the display unit 120 forms an image. The whole display can thus be changed to a large extent to be able to improve visibility, legibility and design.

According to the embodiment, the first vehicle information alone can be indicated by the first pointer 145 when the first pointer 145 and the dial 143 are lit by turning on the first light source 142, the second pointer 154 is extinguished by turning off the second light source 152, and the first pointer 145 and the dial 143 are moved to a predetermined position (e.g., the center) by the moving unit 190, for example.

Here, the inventor has considered a system in which a whole display design can be changed to a large extent while allowing the viewer to visually recognize the two indicators as the virtual image and the real image and allowing the indicators to move relatively to each other including a case where the two overlap each other. When the decorative ring portion is formed in the outer peripheral part of each of the two indicators, however, the ring portions positioned to overlap each other are actually misaligned in some degree to possibly degrade the appearance.

The vehicle display device 100 according to a modification of the embodiment will now be described with reference to FIGS. 24 to 33.

Figure 24:
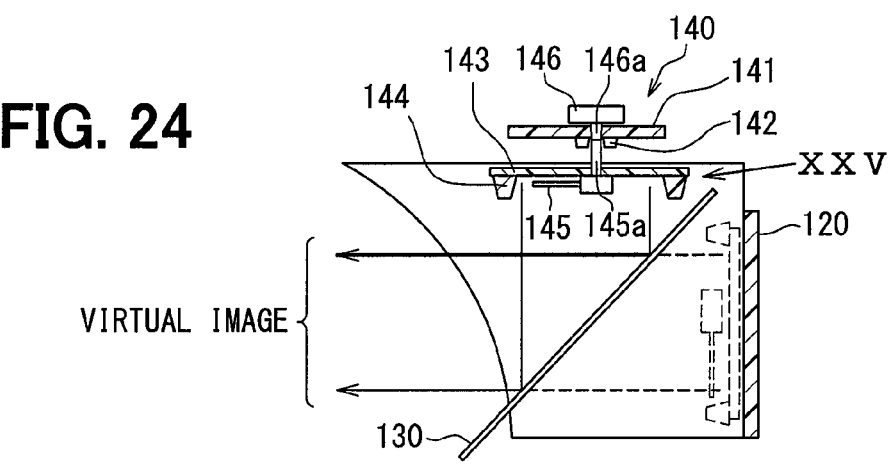
FIG. 24 is a cross-sectional view taken along line II-II in FIG. 1 and illustrates a vehicle display device according to a modification.
Figure 25:
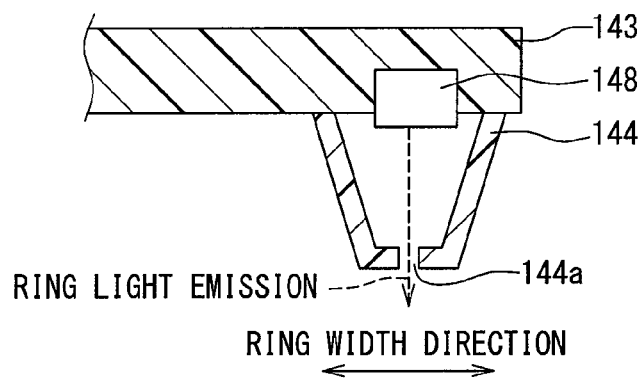
FIG. 25 is an enlarged cross-sectional view of part XXV in FIG. 24.

The first indicator 140 is an indicator mainly indicating vehicle speed among the various pieces of vehicle information. As illustrated in FIGS. 24 and 25, the first indicator 140 includes the board 141, the light source 142, the dial 143, the first ring portion 144, the pointer 145, the motor 146, the arm 147, and a light emitting source 148.

The first indicator 140 is disposed in an outer area of the display area 110 as viewed from the driver, specifically, on an upper side of the outer area of the display area 110 and toward the side of the driver relative to the display surface 121 (such a position will be hereinafter referred to as a ceiling side of the display area 110), such that a plate surface of each of the board 141 and the dial 143 is oriented in the horizontal direction. Accordingly, the first indicator 140 (the dial 143, the first ring portion 144, the pointer 145) is positioned on an upper side of the one-way mirror 130 and is reflected off the one-way mirror 130 to be visually recognized as a virtual image by the driver, as illustrated in FIGS. 26(*d*), 26(*e*), and 26(*f*).

The first ring portion 144 is hollow inside as illustrated in FIG. 25. A slit 144*a* connecting the inner space and the outside is formed at a protrusion (a lower end portion in FIG. 25) of the first ring portion 144 protruding from the dial 143. The slit 144*a* is continuously formed all around the circumference of the first ring portion 144 in the middle of the ring width.

The illumination light source 148 is turned on to make the first ring portion 144 lit. In the cavity of the first ring portion 144, the illumination light source 148 is provided at a plurality of sites on a bottom surface of the dial 143 in the circumferential direction of the first ring portion 144. The illumination light source 148 emits light from inside the cavity of the first ring portion 144 toward the slit 144*a* as indicated by a broken arrow in FIG. 25. The illumination light source 148 can be formed of, for example, a blue light-emitting diode (LED). The light leaks out through the slit 144*a* when the illumination light source 148 is turned on. Accordingly, as illustrated in FIG. 26(*f*), a blue ring of light is formed in the middle of the ring width of the first ring portion 144 and makes the first ring portion 144 lit.

The board 151, the light source 152, the pointer 154, and the motor 155 of the second indicator 150 are disposed on the left side of the ceiling side of the display area 110 as viewed from the driver, where a plate surface of the board 151 is oriented in the horizontal direction. Accordingly, the pointer 154 is positioned on the upper side of the one-way mirror 130 and is reflected off the one-way mirror 130 to be visually recognized as a virtual image by the driver, as illustrated in FIG. 26(*d*).

The second ring portion 153 and the arm 156 of the second indicator 150 are disposed on the side of the driver relative to the display surface 121 and on the left side as viewed from the driver. Accordingly, the second ring portion 153 transmits through the one-way mirror 130 from the side of the display surface 121 to be visually recognized as a real image by the driver, as illustrated in FIGS. 26(*a*), 26(*b*), and 26(*c*).

The water temperature indicator 170 is fixedly disposed on the right ceiling side of the display area 110 as viewed from the driver such that a plate surface of each of the board 171 and the dial 173 is oriented in the horizontal direction. Accordingly, the water temperature indicator 170 (the dial 173, the ring portion 174, the pointer 175) is positioned on the upper side of the one-way mirror 130 and is reflected off the one-way mirror 130 to be visually recognized as a virtual image by the driver, as illustrated in FIGS. 26(*d*), 26(*e*), and 26(*f*).

The fuel indicator 180 is fixedly disposed on the left ceiling side of the display area 110 as viewed from the driver such that a plate surface of each of the board and the dial is oriented in the horizontal direction. Accordingly, the fuel indicator 180 (the dial 183, the ring portion 184, the pointer 185) is positioned on the upper side of the one-way mirror 130 and is reflected off the one-way mirror 130 to be visually recognized as a virtual image by the driver, as illustrated in FIGS. 26(*d*), 26(*e*), and 26(*f*).

When the shaft of the motor 191 rotates in the predetermined direction (e.g., the direction indicated by the solid arrow in FIG. 5) and stops at a first rotational position, the virtual images of the dial 143, the first ring portion 144, and the pointer 145 of the first indicator 140 are visually recognized at a predetermined position on the right side of the display area 110 as illustrated in FIG. 26(*d*). The real image of the second ring portion 153 of the second indicator 150 is visually recognized at a predetermined position on the left side of the display area 110 as illustrated in FIG. 26(*a*). At this time, the pointer 154 of the second indicator 150 is visually recognized as a virtual image inside the real image of the second ring portion 153 when the light source 152 is turned on.

On the other hand, when the shaft of the motor 191 rotates in a direction (e.g., the direction indicated by the broken arrow in FIG. 5) counter to the predetermined direction and stops at a second rotational position, the virtual images of the dial 143, the first ring portion 144, and the pointer 145 of the first indicator 140 move from the right side of the display area 110 to the left side of the display area 110 as illustrated in FIG. 26(*e*) to be visually recognized at the center as illustrated in FIG. 26(*f*). The real image of the second ring portion 153 of the second indicator 150 moves from the left side of the display area 110 to the right side of the display area 110 as illustrated in FIG. 26(*b*) to be visually recognized at the center as illustrated in FIG. 26(*c*).

Upon moving to the center of the display unit 120, the virtual image of the first ring portion 144 and the real image of the second ring portion 153 overlap each other. The overlap between the virtual image of the first ring portion 144 and the real image of the second ring portion 153 forms the third indicator 160 at the center as illustrated in FIGS. 26(*c*) and 26(*f*).

The control unit 210 performs control to form an image on the display unit 120, control to turn on each of the light sources 142, 152, 172, and 182, control to turn each of the pointers 145, 154, 175, and 185, and control to actuate the moving unit 190, on the basis of the on and off signals from the ignition switch 10, the selector signal from the selector lever 11, the detection signal from the detector 12, the switch signal from the selection switch, and a sensor signal from various sensors sensing a state of travel (the details of control will be described later).

Figure 27:
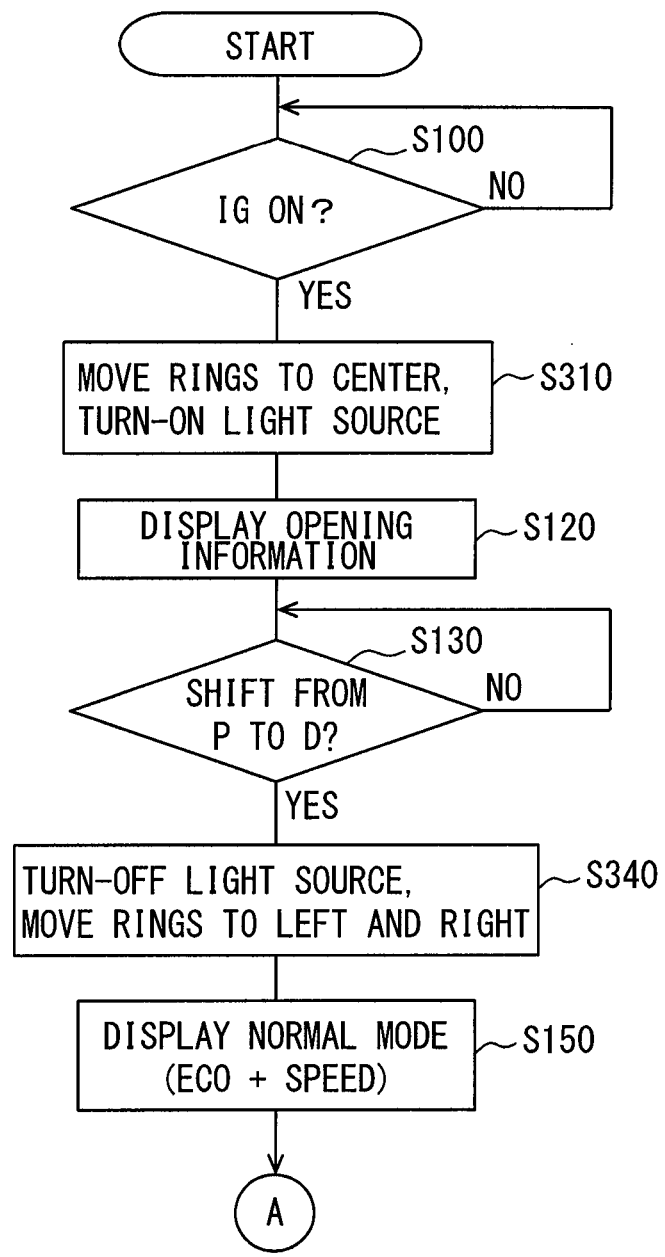
FIG. 27 is a flowchart of display control performed by the vehicle display device.
Figure 28:
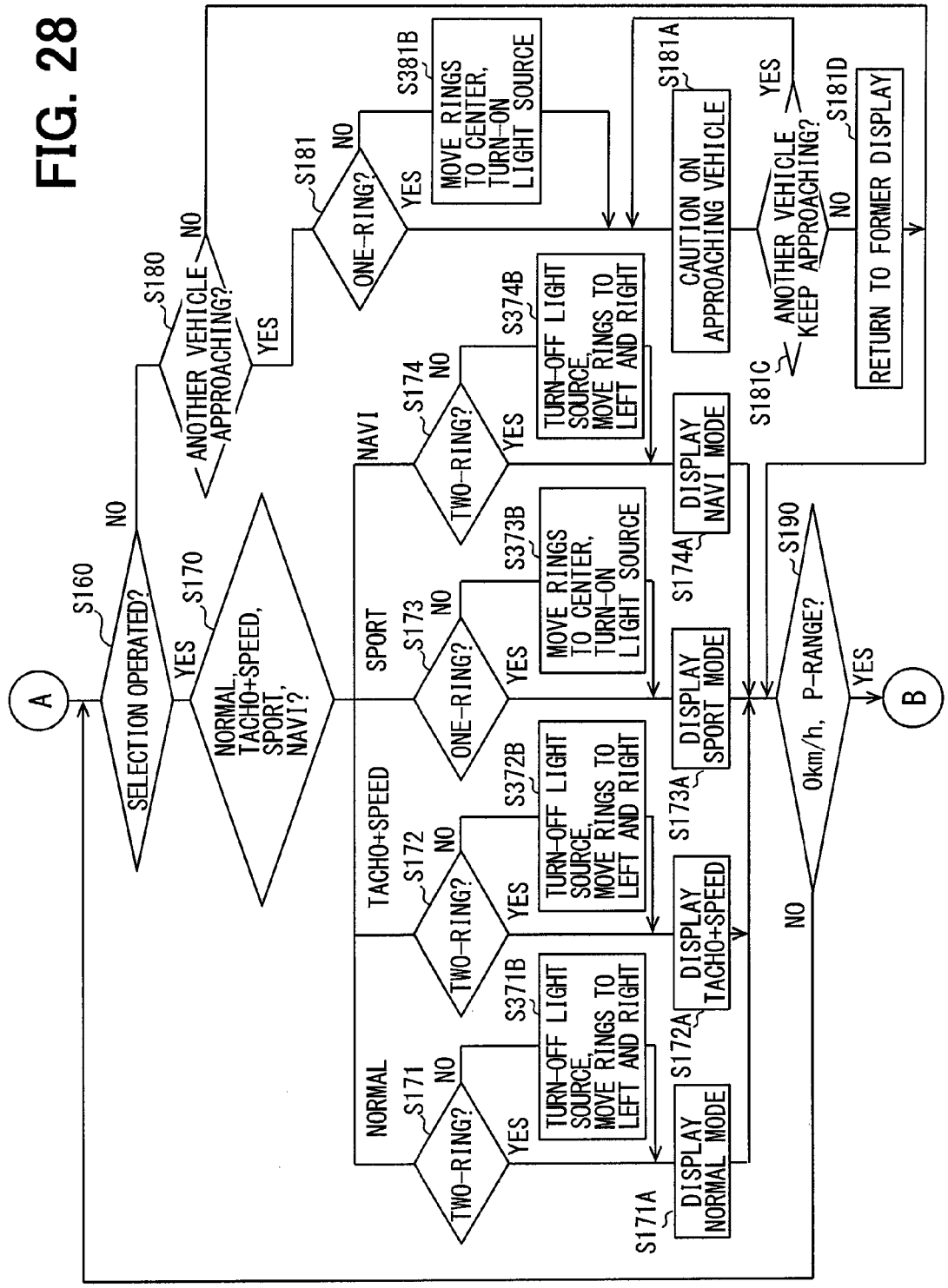
FIG. 28 is a flowchart of the display control performed by the vehicle display device.
Figure 29:
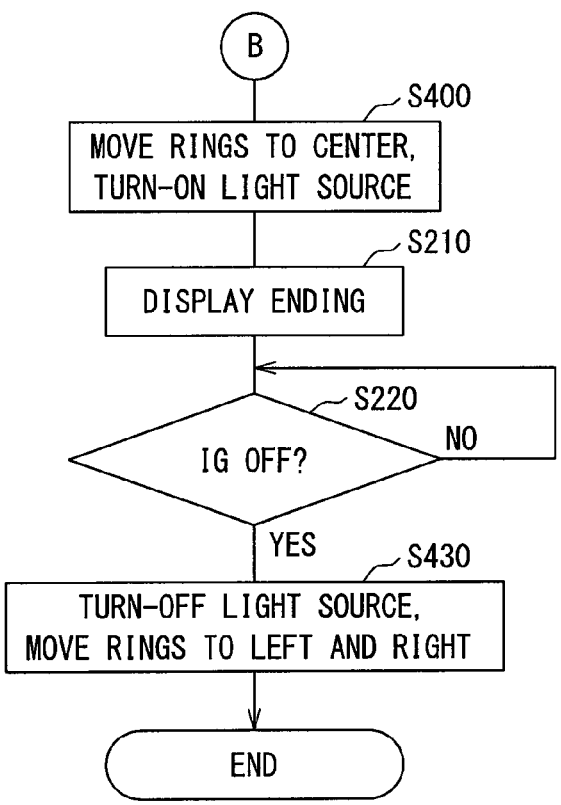
FIG. 29 is a flowchart of the display control performed by the vehicle display device.

The operation of the display device 100 based on the aforementioned configuration will now be described with reference to flowcharts in FIGS. 27 to 29 illustrating display control as well as FIGS. 30 to 33 illustrating various display states.

With the ignition switch 10 turned off, the control unit 210 first performs control such that the "two-ring" positional relationship between the virtual image of the first ring portion 144 and the real image of the second ring portion 153 as illustrated in FIG. 10 is maintained by the moving unit 190. The display unit 120 is turned off (i.e., no image is formed thereon), each of the light sources 142, 152, 172, and 182 is turned off, and each of the pointers 145, 154, 175, and 185 is at rest.

Then in step S100, the control unit 210 determines whether the ignition switch 10 is turned on. Upon detecting the on signal and determining that the ignition switch 10 is turned on, the control unit 210 in step S310 actuates the motor 191 of the moving unit 190 to bring the virtual image of the first ring portion 144 and the real image of the second ring portion 153 into the "one-ring" positional relationship. In other words, as described with reference to FIG. 5, the belt 194 (194*a*, 194*b*) is driven in the direction indicated by the broken arrow in FIG. 5 to cause the virtual image of the first ring portion 144 and the real image of the second ring portion 153 to move to the center of the display area 110 (FIG. 11) and to overlap each other. The third indicator 160 is formed at the center of the display area 110 as a result.

In step S310, the control unit 210 turns on the illumination light source 148 when the virtual image of the first ring portion 144 and the real image of the second ring portion 153 overlap each other. The illumination light source 148 thus makes the first ring portion 144 lit. Specifically, as illustrated in FIG. 30, a driver visually recognizes the blue ring of light (i.e., the luminous ring) in the overlapping ring portions.

Figure 30:
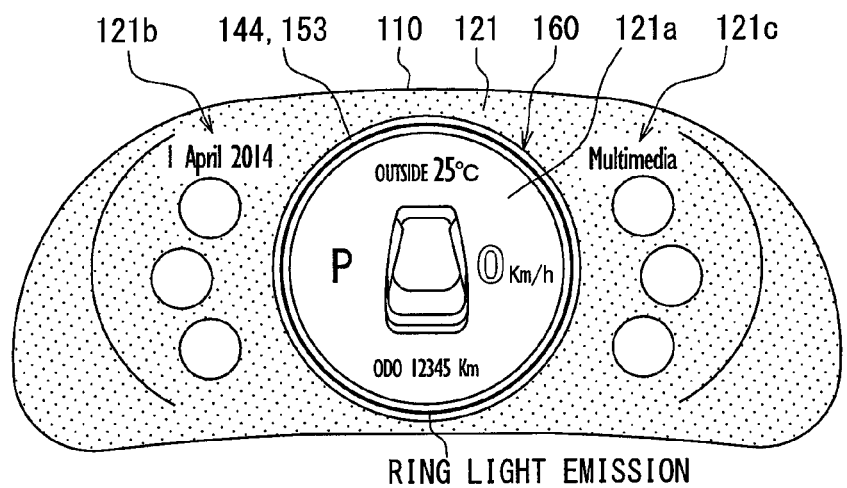
FIG. 30 illustrates an opening mode.

In step S120, the control unit 210 performs display in the opening mode as illustrated in FIG. 30. The opening mode causes the display unit 120 to form and display an information image 121*a* at a position corresponding to the third indicator 160 and information images 121*b* and 121*c* at positions corresponding to left and right sides of the third indicator 160. The information images 121*a*, 121*b*, and 121*c* are visually recognized as real images on the display surface 121 through the one-way mirror 130.

In step S130, the control unit 210 determines whether the selector lever 11 is shifted to result in a change of the selector signal from P (park) to D (drive). The processing proceeds to step S340 when the determination is affirmative.

In step S340, the control unit 210 actuates the motor 191 of the moving unit 190 to bring the virtual image of the first ring portion 144 and the real image of the second ring portion 153 into the "two-ring" positional relationship as illustrated in FIG. 13. At this time, the control unit 210 performs control to turn off the illumination light source 148 and control to stop formation of the luminous ring of the first ring portion 144.

As described with reference to FIG. 5, the "two-ring" positional relationship is formed when the control unit 210 drives the belt 194 (194*a*, 194*b*) in the direction indicated by the solid arrow in FIG. 5 to cause the virtual image of the first ring portion 144 and the real image of the second ring portion 153 to move left and right within the display area 110 and to reach predetermined left and right positions.

At this time, the display unit 120 stops forming the images 121*a*, 121*b*, and 121*c*, each of the light sources 142, 152, 172, and 182 stays turned off, and each of the pointers 145, 154, 175, and 185 stays at rest. Accordingly, only the two ring portions 144 and 153 are visually recognized on the display surface 121 being the black ground.

In step S150, the control unit 210 performs display in the normal mode. The normal mode displays the vehicle speed in the first indicator 140 and the drive mode in the second indicator 150 in the "two-ring" positional relationship, as illustrated in FIG. 14. The drive mode indicates whether a current driving state corresponds to an ECO mode with an emphasis on fuel economy, a POWER mode with an emphasis on drive, or a CHARGE mode exploiting an engine brake at the time of deceleration.

In step S160, the control unit 210 determines whether the selection switch 200 is operated by the driver. The control unit 210 makes the determination on the basis of the presence or absence of the switch signal from the selection switch 200. The processing proceeds to step S170 when the determination in step S160 is affirmative.

In step S170, it is determined which of the normal mode, the tachometer-speedometer mode, the sport mode, and the navigation mode the switch signal from the selection switch 200 corresponds to.

When determining in step S170 that the signal corresponds to the normal mode, the control unit 210 determines in step S171 whether the virtual image of the first ring portion 144 and the real image of the second ring portion 153 are in the "two-ring" positional relationship. When the determination is affirmative, the control unit 210 in step S171A performs the display in the normal mode (FIG. 14) as described in step S150.

When the determination in step S171 is negative, the virtual image of the first ring portion 144 and the real image of the second ring portion 153 are in the "one-ring" positional relationship. In this case, the control unit 210 in step S371B turns off the illumination light source 148 and actuates the moving unit 190 such that the virtual image of the first ring portion 144 and the real image of the second ring portion 153 are brought into the "two-ring" positional relationship. Step S171A is performed after that.

When determining in step S170 that the signal corresponds to the tachometer-speedometer mode, the control unit 210 determines in step S172 whether the virtual image of the first ring portion 144 and the real image of the second ring portion 153 are in the "two-ring" positional relationship. The control unit 210 performs display in the tachometer-speedometer mode in step S172A when the determination is affirmative.

The tachometer-speedometer mode displays the vehicle speed in the first indicator 140 and the engine speed in the second indicator 150 in the "two-ring" positional relationship, as illustrated in FIG. 15.

When the determination in step S172 is negative, the virtual image of the first ring portion 144 and the real image of the second ring portion 153 are in the "one-ring" positional relationship, in which case the control unit 210 in step S372B performs control such that the illumination light source 148 is turned off and the virtual image of the first ring portion 144 and the real image of the second ring portion 153 are brought into the "two-ring" positional relationship. Step S172A is performed after that.

When determining in step S170 that the signal corresponds to the sport mode, the control unit 210 determines in step S173 whether the virtual image of the first ring portion 144 and the real image of the second ring portion 153 are in the "one-ring" positional relationship. The control unit 210 performs display in the sport mode in step S173A when the determination is affirmative.

When the determination in step S173 is negative, the virtual image of the first ring portion 144 and the real image of the second ring portion 153 are in the "two-ring" positional relationship, in which case the control unit 210 in step S373B performs control such that the virtual image of the first ring portion 144 and the real image of the second ring portion 153 are brought into the "one-ring" positional relationship and the illumination light source 148 is turned on. Step S173A is performed after that. FIG. 16 illustrates the display state pertaining to step S373B, in which the control unit 210 performs control in the same manner as that described in step S310.

Figure 31:
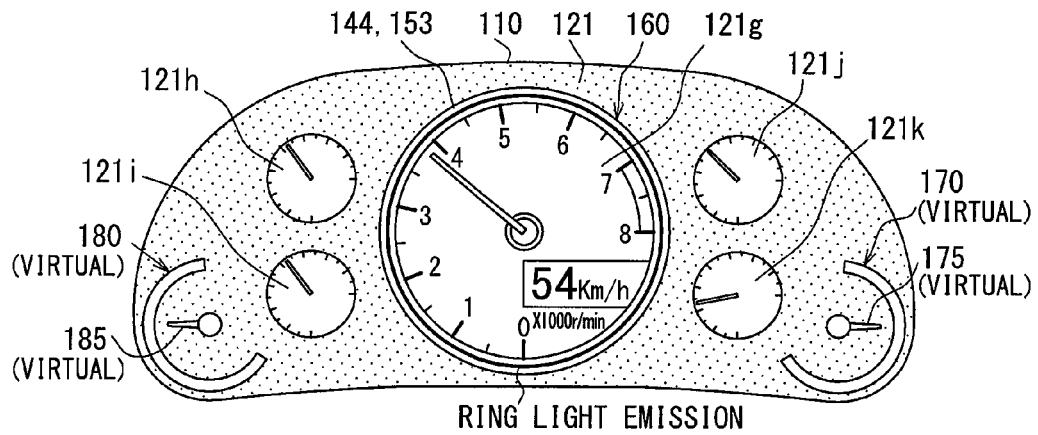
FIG. 31 illustrates a sport mode.

As illustrated in FIG. 31, the sport mode in step S173A displays the engine speed (indicated by the pointer) and the vehicle speed (displayed digitally) in the ring portion (i.e., the third indicator 160) overlapping at the center of the display area 110 in the "one-ring" positional relationship. The blue luminous ring receiving light from the illumination light source 148 is visually recognized in the overlapping ring portions.

As with step S171A, the control unit 210 controls the water temperature indicator 170 such that the light source 172 is turned on, the pointer 175 is actuated, and the virtual images of the dial 173, the ring portion 174, and the pointer 175 are displayed through the one-way mirror 130. Likewise, the control unit 210 controls the fuel indicator 180 such that the light source 182 is turned on, the pointer 185 is actuated, and the virtual images of the dial 183, the ring portion 184, and the pointer 185 are displayed through the one-way mirror 130.

When determining in step S170 that the signal corresponds to the navigation mode, the control unit 210 determines in step S174 whether the virtual image of the first ring portion 144 and the real image of the second ring portion 153 are in the "two-ring" positional relationship. The control unit 210 performs display in the navigation mode in step S174A when the determination is affirmative.

The navigation mode displays the vehicle speed in the first indicator 140 and navigation information in the second indicator 150 in the "two-ring" positional relationship, as illustrated in FIG. 19.

As with step S171A, the control unit 210 controls the water temperature indicator 170 such that the light source 172 is turned on, the pointer 175 is actuated, and the virtual images of the dial 173, the ring portion 174, and the pointer 175 are displayed through the one-way mirror 130. Likewise, the control unit 210 controls the fuel indicator 180 such that the light source 182 is turned on, the pointer 185 is actuated, and the virtual images of the dial 183, the ring portion 184, and the pointer 185 are displayed through the one-way mirror 130.

In addition, as with step S171A, the control unit 210 causes the display unit 120 to form the information image 121e at the position between the virtual image of the first ring portion 144 and the real image of the second ring portion 153. The information image 121e is displayed as the real image on the display surface 121 through the one-way mirror 130.

When the determination in step S174 is negative, the virtual image of the first ring portion 144 and the real image of the second ring portion 153 are in the "one-ring" positional relationship. In this case, the control unit 210 in step S374B performs control such that the illumination light source 148 is turned off and the virtual image of the first ring portion 144 and the real image of the second ring portion 153 are brought into the "two-ring" positional relationship. Step S174A is performed after that. FIG. 18 illustrates the display state pertaining to step S374B, in which the control unit 210 performs control in the same manner as that described in step S340.

The control to switch the display based on the operation on the selection switch 200 is repeated between step S160 described above and step S190 to be described later.

On the other hand, the processing proceeds to step S180 when the determination in step S160 is negative. In step S180, the control unit 210 determines whether another vehicle, a pedestrian or the like is approaching the own vehicle, on the basis of the detection signal from the detector 12. It is determined that another vehicle is approaching the own vehicle when the other vehicle is detected at a position within a predetermined distance to the own vehicle.

When the determination in step S180 is affirmative, the control unit 210 determines in step S181 whether the virtual image of the first ring portion 144 and the real image of the second ring portion 153 are in the "one-ring" positional relationship and, when making an affirmative determination, displays a caution on the approaching vehicle in step S181A.

When the determination in step S181 is negative, the virtual image of the first ring portion 144 and the real image of the second ring portion 153 are in the "two-ring" positional relationship, in which case the control unit 210 in step S381B performs control such that the virtual image of the first ring portion 144 and the real image of the second ring portion 153 are brought into the "one-ring" positional relationship and the illumination light source 148 is turned on. Step S181A is performed after that.

Figure 32:
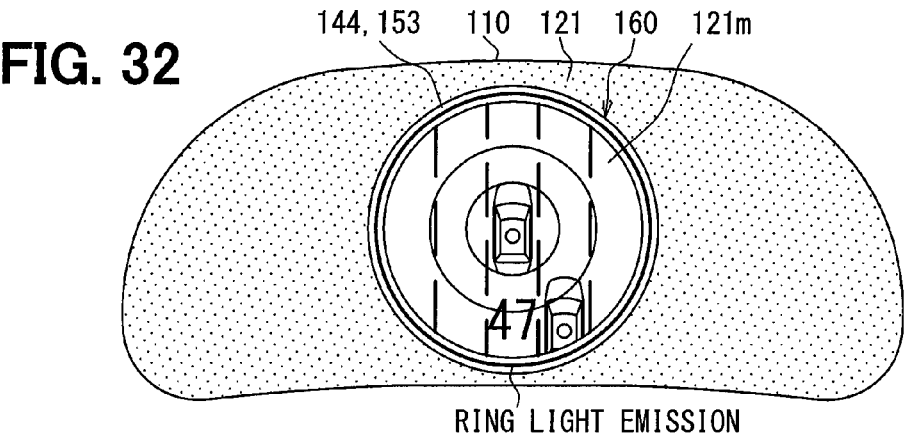
FIG. 32 illustrates an approaching vehicle caution mode.

As illustrated in FIG. 32, the caution display on the approaching vehicle in step S181A displays a positional relationship between the own vehicle and the other vehicle within the ring portion (i.e., the third indicator 160) overlapping at the center of the display area 110 in the "one-ring" positional relationship. The blue luminous ring receiving light from the illumination light source 148 is visually recognized in the overlapping ring portions.

In step S181C, the control unit 210 determines whether the other vehicle keeps approaching. The control unit 210 continues performing step S181A when determining that the other vehicle keeps approaching. When it is determined the other vehicle stops approaching, the processing proceeds to step S181D. The control unit 210 switches the display mode to one before the caution display on the approaching vehicle is performed (step S181A).

The control unit 210 turns off the illumination light source 148 when the preceding display mode is a mode with the "two-ring" positional relationship, or keeps the illumination light source 148 turned on when the preceding display mode is a mode with the "one-ring" positional relationship.

The caution display on the approaching vehicle based on the detection signal from the detector 12 is repeated between step S180 described above and step S190 to be described later.

After steps S171A, S172A, S173A, S174A, S180 (negative determination), and S181D, the processing proceeds to step S190, in which the control unit 210 determines whether the vehicle speed is 0 km/h and the selector signal is "P". In other words, the control unit 210 determines whether the vehicle comes to a stop and is shifted to park by the selector lever 11.

The processing returns to step S160 when the control unit 210 makes a negative determination in step S190, or proceeds to step S400 when the control unit 210 makes an affirmative determination in step S190. As with step S310, the control unit 210 in step S400 actuates the motor 191 of the moving unit 190 to bring the virtual image of the first ring portion 144 and the real image of the second ring portion 153 into the "one-ring" positional relationship and turns on the illumination light source 148.

Figure 33:
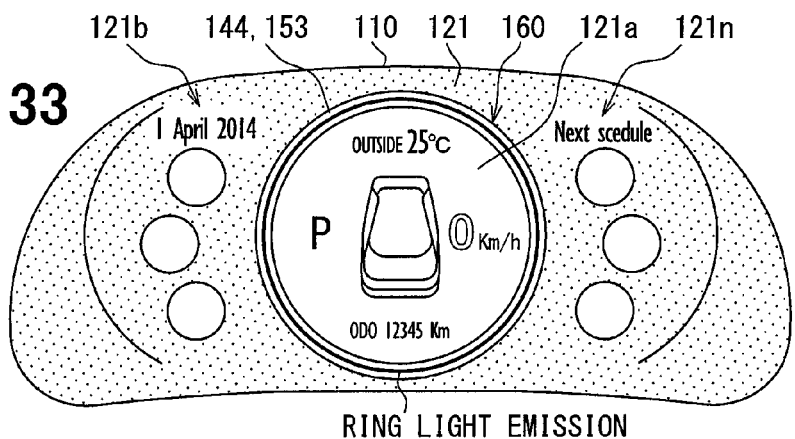
FIG. 33 illustrates an ending mode.

In step S210, the control unit 210 performs display in the ending mode as illustrated in FIG. 33. As with the display in the opening mode in step S120, the ending mode causes the display unit 120 to form and display the information image 121a at the position corresponding to the third indicator 160 and the information images 121b and 121n at the positions corresponding to the left and right sides of the third indicator 160. The information images 121a, 121b, and 121n are visually recognized as real images on the display surface 121 through the one-way mirror 130. The blue luminous ring receiving light from the illumination light source 148 is visually recognized in the overlapping ring portions.

The information images 121a and 121b are identical to the images displayed in the opening mode in step S120. The information image 121n displays schedule information from that point on.

Upon determining in step S220 that the ignition switch 10 is turned off, the control unit 210 in step S430 turns off the illumination light source 148 and actuates the motor 191 of the moving unit 190 to bring the virtual image of the first ring portion 144 and the real image of the second ring portion 153 into the "two-ring" positional relationship as illustrated in FIGS. 22 and 23.

The embodiment provides the first ring portion 144 visually recognized as the virtual image and the second ring portion 153 visually recognized as the real image, where the first ring portion 144 and the second ring portion 153 are relatively moved by the moving unit 190. The control unit 210 turns on the illumination light source 148 for the first ring portion 144 when the virtual image of the first ring portion 144 and the real image of the second ring portion 153 overlap each other.

Accordingly, the illumination light source 148 makes the first ring portion 144 lit when the virtual image of the first ring portion 144 and the real image of the second ring portion 153 overlap each other. The lit first ring portion 144 stands out to the driver when the virtual image of the first ring portion 144 and the real image of the second ring portion 153 overlap each other so that, even when the ring portions are substantially misaligned, the misalignment in some degree can be less conspicuous. The degradation in appearance caused by the misalignment can thus be mitigated.

The slit 144a is continuously formed in the middle of the ring width of the first ring portion 144 in the circumferential direction so that, when the illumination light source 148 is turned on, the light leaking through the slit 144a makes the first ring portion 144 lit.

The illumination makes the middle of the ring width of the first ring portion 144 stand out to the driver, who thus does not look toward an edge of the ring width which is subject to misalignment. The degradation in appearance caused by the misalignment can thus be effectively restricted.

Other Embodiments

In the aforementioned embodiment, the first indicator 140, the pointer 154 of the second indicator 150, the water temperature indicator 170, and the fuel indicator 180 are disposed on the upper side (i.e., the ceiling side) of the display area 110 to be disposed on the outer side of the display area 110. The indicators may also be disposed on the lower side of the display area 110, for example. In this case, the one-way mirror 130 may be tilted oppositely (such that the upper side of the mirror is tilted toward the driver).

The first ring portion 144 and the second ring portion 153 are both connected to the moving unit 190 so as to be movable. Alternatively, the second ring portion 153 may be adapted to be disconnected from the moving unit 190. In this case, the movement of the first ring portion 144 causes the ring portions 144 and 153 to move relatively to each other and to establish the "one-ring" or "two-ring" positional relationship.

While the second ring portion 153 is formed as the substantial ring portion, the display unit 120 may form an image of the second ring portion to be provided as an image ring portion.

In the aforementioned embodiment, the first indicator 140 (the first pointer 145) is connected to the moving unit 190 so as to be movable, whereas the second pointer 154 of the second indicator 150 is not connected to the moving unit 190; however, the embodiment of the disclosure is not limited to this configuration. Alternatively, the second pointer 154 may also be connected to the moving unit 190 so as to be movable.

The dial 143 is provided in the first indicator 140 but need not be provided. Vehicle information corresponding to the dial 143 can be formed as an image by the display unit 120.

Both the first pointer 145 and the dial 143 of the first indicator 140 are lit or extinguished by the first light source 142; however, the embodiment of the disclosure is not limited to this configuration. For example, the dial 143 may be lit or extinguished independently of the first pointer 145 by another light source different from the first light source 142 so that, when the first pointer 145 is lit and the dial 143 is extinguished, the display unit 120 may form and display another vehicle information. As a result, the vehicle information displayed in the first indicator 140 can be changed while using the first pointer 145.

In the aforementioned embodiment, the first ring portion 144 is provided with the slit 144a to form the luminous ring in the first ring portion 144 by the light emitted from the illumination light source 148; however, the embodiment of the disclosure is not limited to this configuration. For example, the first ring portion 144 may be made from a light transmissive material. Light-shielding treatment (e.g., coating, vapor deposition, plating) may then be performed on the surface of the first ring portion 144 to form a cleared portion, the light-shielding treatment on which is removed, continuously along the circumference of the ring portion in the middle of the ring width. Accordingly, when the illumination light source 148 is turned on, light leaking through the cleared portion can make the first ring portion 144 lit.

Alternatively, the first ring portion 144 may be made from a light transmissive material to make the entire first ring portion 144 lit without applying surface coating or plating, or forming the slit 144a. The color of the illumination light source 148 is not limited to blue but may be another color.

The illumination light source 148 provided in the first ring portion 144 in the aforementioned embodiment may also be provided in the second ring portion 153.

Both the first ring portion 144 and the second ring portion 153 are connected to the moving unit 190 so as to be movable. Alternatively, either one of the ring portions may be moved. In this case, the movement of either one of the ring portions causes the ring portions 144 and 153 to move relatively to each other and to establish the "one-ring" or "two-ring" positional relationship.

What is claimed is:

1. A display device that displays various information associated with a travel of a vehicle for a viewer within a display area, the display device comprising:
    a first ring portion that forms an outer periphery of a first indicator indicating at least one vehicle information of the various information, the first ring portion being visually recognized as a virtual image within the display area; and
    a moving mechanism that is able to move a position of the first ring portion; and
    a second ring portion that forms an outer periphery of a second indicator indicating a vehicle information different from that indicated by the first indicator, the second ring portion being visually recognized as a real image within the display area, wherein
    the first ring portion is moved by the moving mechanism to allow the virtual image of the first ring portion and the real image of the second ring portion to move relatively to each other between a position at which the ring portions overlap each other and a position at which the ring portions are separated from each other by a predetermined distance.

2. The display device according to claim 1, wherein:
    the moving mechanism includes:
        a driving motor;
        a first pulley that is fixed to a rotary shaft of the motor;
        a second pulley that is disposed away from the first pulley; and
        a belt that runs between the first pulley and the second pulley; and
    the first ring portion is connected to an outgoing side of the belt while the second ring portion is connected to a returning side of the belt to allow the virtual image of the first ring portion and the real image of the second ring portion to move relatively to each other.

3. The display device according to claim 1, wherein the second ring portion is either a substantial ring portion that is formed of a substantial material or an image ring portion that is formed of an image.

4. A display device that displays various information associated with a travel of a vehicle for a viewer within a display area, the display device comprising:
    a first ring portion that forms an outer periphery of a first indicator indicating a first vehicle information of the various information, the first ring portion being visually recognized as a virtual image within the display area;
    a second ring portion that forms an outer periphery of a second indicator indicating a second vehicle information of the various information, the second ring portion being visually recognized as a real image within the display area;
    an illumination light source that makes either one of the first ring portion and the second ring portion luminous;
    a moving mechanism that is able to move a position of at least one of the first ring portion and the second ring portion; and
    a control unit that turns on the illumination light source when the first ring portion and the second ring portion are moved relatively to each other by the moving mechanism to allow the virtual image of the first ring portion and the real image of the second ring portion to overlap each other.

5. The display device according to claim 4, wherein:
    the either one has a slit that is continuously formed in a circumferential direction at a middle of a ring width; and
    the either one is made luminous by light leaking through the slit when the illumination light source is turned on.

6. The display device according to claim 4, wherein:
    the either one is made from a light transmissive material;
    the either one has a cleared portion that is continuously formed in a circumferential direction at a middle of a ring width, while a light-shielding treatment is performed on a surface of the either one, the light-shielding treatment being removed relative to the cleared portion; and
    the either one is made luminous by light leaking through the cleared portion when the illumination light source is turned on.

* * * * *